(12) United States Patent
Wassmann et al.

(10) Patent No.: US 11,584,668 B2
(45) Date of Patent: Feb. 21, 2023

(54) REMEDIATION AND/OR RESTORATION OF AN ANOXIC BODY OF WATER

(71) Applicant: YARA INTERNATIONAL ASA, Oslo (NO)

(72) Inventors: Hartmut Wassmann, Hohen Neuendorf (DE); Roman Klemz, Berlin (DE)

(73) Assignee: YARA INTERNATIONAL ASA, Oslo (NO)

( * ) Notice: Subject to any disclaimer, the term of this patent is extended or adjusted under 35 U.S.C. 154(b) by 1180 days.

(21) Appl. No.: 16/076,014

(22) PCT Filed: Mar. 24, 2017

(86) PCT No.: PCT/EP2017/057041
§ 371 (c)(1),
(2) Date: Aug. 7, 2018

(87) PCT Pub. No.: WO2017/162847
PCT Pub. Date: Sep. 28, 2017

(65) Prior Publication Data
US 2021/0269336 A1  Sep. 2, 2021

(30) Foreign Application Priority Data
Mar. 24, 2016 (EP) .................. 16162307

(51) Int. Cl.
*C02F 1/68* (2006.01)
*C02F 3/26* (2006.01)
(Continued)

(52) U.S. Cl.
CPC ............ *C02F 1/686* (2013.01); *C02F 1/68* (2013.01); *C02F 3/26* (2013.01); *C02F 3/305* (2013.01);
(Continued)

(58) Field of Classification Search
CPC .... C02F 1/68; C02F 3/26; C02F 3/305; C02F 3/02; C02F 7/00; C02F 2103/007;
(Continued)

(56) References Cited

U.S. PATENT DOCUMENTS 3,956,124 A  *  5/1976  Fast .................... C02F 3/26
                                                  210/600
2006/0086663 A1 *  4/2006  Chowdhury ......... B09C 1/002
                                                  210/620

FOREIGN PATENT DOCUMENTS

CN       1761625 A      4/2006
WO    2004078661 A1    9/2004

OTHER PUBLICATIONS

Parsons "Report for the first year of the nitrate addition pilot test in the hypolimnion of onondaga lake", Aug. 23, 2012, p. 49PP (Year: 2012).*

(Continued)

*Primary Examiner* — Jason M Greene
*Assistant Examiner* — Bernadette Karen McGann
(74) *Attorney, Agent, or Firm* — Amster Rothstein & Ebenstein LLP

(57) ABSTRACT

The application relates to a method for remediation and/or restoration of an anoxic body of water (10), wherein a calcium nitrate solution (3) is added to the anoxic body of water (10), and wherein the method comprises the steps of mixing water having a percent of oxygen saturation of between 50% and 150% with the calcium nitrate solution (3), resulting in a mixture, and pumping the mixture into the anoxic body of water (10), wherein the final concentration of nitrate-N in the remedied and/or restored anoxic body of water (10) is between 1 and 20 mg/l. The application furthermore relates to a system (1) for remediation and/or restoration of an anoxic body of water (10), wherein the system (1) is provided with means to add a calcium nitrate (Continued)

solution (3) to the anoxic body of water (10), wherein the means to add the calcium nitrate solution (3) to the anoxic body of water (10) consists of a mixing device (2) arranged to mix the calcium nitrate solution (3) with water having a percent of oxygen saturation of between 50% and 150%, resulting in a mixture, and wherein the system (1) comprises first pumping means (5) for pumping the mixture into the anoxic body of water (10).

20 Claims, 11 Drawing Sheets

(51) Int. Cl.
- *C02F 3/30* (2006.01)
- *C02F 7/00* (2006.01)
- *C02F 103/00* (2006.01)

(52) U.S. Cl.
CPC .......... *C02F 7/00* (2013.01); *C02F 2103/007* (2013.01); *C02F 2305/06* (2013.01); *Y02W 10/10* (2015.05)

(58) Field of Classification Search
CPC .... C02F 2305/06; Y02W 10/10; B09C 1/002; B09C 1/08
See application file for complete search history.

(56) References Cited

OTHER PUBLICATIONS

Anonymous: "Report for the first year of the nitrate addition pilot test in the hypolimnion of Onondaga Lake (2011 ),"3 Parsons, Aug. 23, 2012 (Aug. 23, 2012), p. 49PP, XP002762964, Retrieved from the internet: URL:http://www.dec.ny. gov/docs/regionspdf/nitratrpt11. pdf [retrieved on Oct. 13, 2016], (Year: 2012).*

Yara Chemical Safety Data Sheet for Yara Liva CN-8 (Year: 2012).*

"Dissolved Oxygen Why Is It Important?" by Water on the Web https://www.waterontheweb.org/under/waterquality/oxygen.html (2004) (Year: 2004).*

Willenbring, P.R., Miller, M.S. and Weidenbacher, W.D., 1984. Reducing sediment phosphorus release rates in Long Lake through the use of calcium nitrate. Lake and Reservoir Management, 1(1), pp. 118-121 (Year: 1984).*

Chinese Office Action dated Sep. 17, 2020 from Chinese Patent Application No. 201780015152.0.

Zong et al., "Mechanisms and Application of Calcium Nitrate in the Remediation of Polluted Sediment," China Academic Journal Electronic Publishing House, Dec. 31, 2006, pp. 52-54 (with English translation of Abstract).

"Operations and Monitoring Plan for Adding Nitrate Full Scale to the Hypolimnion of Onondaga Lake," prepared for Honeywell, prepared by Parsons and Upstate Freshwater Institute, Aug. 14, 2014, 28 pages.

PCT International Search Report and Written Opinion dated Jul. 14, 2017 for PCT International Patent Application No. PCT/EP2017/057041, 17 pages.

PCT Notification of Transmittal of the International Preliminary Report on Patentability dated Jul. 4, 2018 for PCT International Patent Application No. PCT/EP2017/057041, 36 pages.

Anonymous: "Report for the first year of the nitrate addition pilot test in the hypolimnion of onondaga lake (2011)," Parsons, Aug. 23, 2012 (Aug. 23, 2012), p. 49PP, XP002762964, Retrieved from the Internet:URL:http://www.dec.ny.gov/docs/regions_pdf/nitratrpt11.pdf [retrieved on Oct. 13, 2016].

Dokulil, M T et al: "Restoration of a shallow, ground-water fed urban lake using a combination of internal management strategies: a case study," Arch. Hydrobiol. Spec. Issues Advanc. Limnol., 55, pp. 271-282, Feb. 1, 2000 (Feb. 1, 2000), XP055318984, Retrieved from the Internet:URL:http://www.lakeriver.at/P/2000_Treatment-OldDanube-93-97-DokulilTeubnerDonabaum-F.pdf [retrieved on Oct. 14, 2016].

Jones, B "Oxygen—The Most Important Water Quality Parameter?," Water col. Spring, vol. 23, No. 1, Jan. 1, 2011 (Jan. 1, 2011), XP055318674, Retrieved from the Internet: URL: http://www.indiana.edu/~clp/documents/water_column/Water_Col_V23N1 .pdf [retrieved on Oct. 11, 2016].

Noonan, T A "Water Quali Ty in Long Lake, Minnesota, Following Riplox Sediment Treatment," Lake and Reservoir Management, vol. 2, No. 1, Jan. 1, 1986 (Jan. 1, 1986), pp. 131-137, XP855388866.

Søndergaard, M et al: "Hypolimnetic Nitrate Treatment to Reduce Internal Phosphorus Loading in a Stratified Lake", Lake and Reservoir Management, vol. 16, No. 3, Sep. 23, 2888 (Sep. 23, 2000), pp. 195-204, XP855318678.

Lin J et al: "Effectiveness and Mode of Action of Calcium Nitrate and Phoslock® in Phosphorus Control in Contaminated Sediment, a Microcosm Study," Water Air Soil Pollut, 2015, 226: 330, 13 pages.

Andersen J M "Effect of Nitrate Concentration in Lake Water on Phosphate Release from the Sediment," Water Res., vol. 16, pp. 1119-1126, 1982.

* cited by examiner

REMEDIATION AND/OR RESTORATION OF AN ANOXIC BODY OF WATER

CROSS-REFERENCE TO RELATED APPLICATIONS

This application is a U.S. national stage entry under 35 U.S.C. § 371 of PCT International Patent Application No. PCT/EP2017/057041, filed Mar. 24, 2017, which claims priority to European Patent Application No. 16162307.9, filed Mar. 24, 2016, the contents of which are incorporated herein by reference in their entirety.

TECHNICAL FIELD

This application relates to the technical field of using calcium nitrate [$Ca(NO_3)_2$] solution in remediation and/or restoration of anoxic bodies of water. An anoxic body of water is generally defined as "an area of sea water, fresh water or ground water that is depleted of dissolved oxygen and is a more severe condition of hypoxia (low oxygen conditions)". The US Geological Survey defines anoxic bodies of water as those with dissolved oxygen concentration of less than 0.5 milligrams per litre.

The anoxic bodies of water according to this application include a flat body of water, and the bottom part of a thermally stratified body of water such as thermally stratified rivers, ponds, lakes and the like. A particular anoxic body of water envisaged in this application is the water contained in the sludge or sediment layer at the bottom of a body of water, which can be thermally stratified or not. A pond in general is "a body of standing water, either natural or artificial, that is usually smaller than a lake". The thermal stratification of a body of water refers to a change in the temperature at different depths in the body of water, and is due to the change in water's density with temperature. Diffusion of oxygen from the atmosphere into and within water is a relatively slow process. Turbulent mixing of water is required for dissolved oxygen to be distributed in equilibrium with that of the atmosphere. Subsequent distribution of oxygen in the water of thermally stratified water of body is controlled by a number of solubility conditions, hydrodynamics, inputs from photosynthesis, and losses to chemical and metabolic oxidations (processes with compounds that gain oxygen). It is the lower portion of the water column during the summer stratification where water temperatures are cooler than upper waters. In other words, this lower portion of the water column is usually the anoxic deepest body of water of thermal stratified surface waters. This bottom body of water is called the hypolimnion. It is the "deep water" of a thermally stratified body of water. In other words, the hypolimnion is the dense, bottom layer of water in a thermally-stratified body of water. The hypolimnion is the layer lying below the thermocline. The thermocline, also called the metalimnion in thermally stratified lakes, is generally known as "a thin but distinct layer in a large body of fluid (e.g. water, such as an ocean or lake, or air, such as an atmosphere) in which temperature changes more rapidly with depth than it does in the layers above or below". The epilimnion is the top-most layer in a thermally stratified body of water, occurring above the deeper metalimnion and the deepest hypolimnion. It is warmer and typically has a higher pH and higher dissolved oxygen concentration than the metalimnion and the hypolimnion. As it is exposed at the surface, it typically becomes turbulently mixed as a result of surface wind-mixing. It is also free to exchange dissolved gases such as $O_2$ and $CO_2$ with the atmosphere.

Restoration is generally known as "the process of returning natural resources back to a healthy condition", while remediation is generally known as "the process of addressing contamination (cleanup) in order to protect human health and the environment."

BACKGROUND

In present days, there is an increased inflow of nutrients into surface waters such as ponds, lakes, rivers, etc. which is becoming a worldwide problem. The nutrients are originating amongst others from the acid rain (with $SO_2$ and $NO_x$), sewage, agriculture, and contaminated ground water. In the drainage basins of bodies of water—a drainage basin or catchment basin is an extent or an area of land where all surface water from rain, melting snow, or ice converges to a single point at a lower elevation, usually the exit of the basin, where the waters join another body of water, such as a river, lake, reservoir, estuary, wetland, sea, or ocean—the organic matter production has now dramatically increased because of the intensive use of nutrients by the agriculture in the drainage basin areas, the industrialization and the growth of the population density. The ecosystem's response to the addition of artificial or natural nutrients, mainly phosphates, through amongst other detergents, fertilizers or sewage, to an aquatic system is known as "eutrophication", or more precisely "hypertrophication". An eutrophic body of water is thus "a body of water that is rich in mineral and organic nutrients that promote a proliferation of algae and aquatic plants, resulting in a reduction of dissolved oxygen".

Denitrification is a process in which nitrate ($NO_3^-$) is converted to molecular nitrogen $N_2$ and nitrogen oxides ($NO_x$) by heterotrophic and also certain autotrophic bacteria, and is therefore a loss of nitrogen from an aquatic system. As these processes either contribute or remove nitrogen from the system, they have the potential to affect water quality and the health of the aquatic system. There are potential indirect effects of eutrophication that limit denitrification. For example, bottom water (=the lowermost mass in a body of water) anoxia or the anoxic conditions in sludge or sediment layers limit nitrification and hence denitrification in sediments and bottom waters. Knowledge of the magnitude of denitrification can help predict the eutrophication response of a body of water because nitrogen that is denitrified is largely unavailable to support primary production.

In the absence of molecular oxygen ($O_2$), organic substances and hydrogen sulfide ($H_2S$) are oxidized by nitrate. Thus, nitrate provides under anoxic conditions the possibility of oxidative energy metabolisms. Normally, nitrate is produced during the nitrification of ammonia ($NH_3$), or the conjugate acid ammonium ($NH_4^+$) and oxygen under aerobic conditions. In a body of water (including in sludge or sediments), which has almost all year round oxygen depletion, the natural production of nitrate is not possible and anaerobic decay processes are predominant. Denitrification only occurs at low oxygen levels, and hence is typically applicable to sediments, although it also occurs in the deoxygenated hypolimnia of certain bodies of water. In eutrophic bodies of water, such as lakes, that are stratified, concentrations of $N_2$ may decline in the epilimnion because of reduced solubility as temperatures rise and increase in the hypolimnion from denitrification of nitrate ($NO_3$) to nitrite ($NO_2$) to inorganic nitrogen ($N_2$). Nitrite ($NO_2$) rarely accumulates except in the metalimnion and hypolimnion of eutrophic bodies of water (lakes). Concentrations of nitrite in bodies of water (lakes) are usually very low unless organic pollution is high.

In eutrophic bodies of water, anoxia results in increased levels of ammonia (due to lack of *Nitrosomonas* metabolism) and nitrite (due to lack of *Nitrobacter* metabolism) with increasing depth in the hypolimnion. In oligotrophic bodies of water, high oxygen concentrations permit metabolism of ammonia to nitrate, resulting in low levels of nitrite and ammonia and high levels of nitrate in the hypolimnion. When the hypolimnion of a eutrophic body of water becomes anaerobic, bacterial nitrification of ammonia ceases and the $NH_4^+$-concentrations increase.

Although it is only needed in small amounts, phosphorus is one of the more common growth-limiting elements for phytoplankton (various kinds of minute, floating aquatic plants). These shortages arise because of the geochemical shortage of phosphorus in many drainage basins together with the lack of any biological pathway enabling phosphate fixation similar to that enabling nitrogen fixation. Phytoplankton is only able to use phosphorus in the phosphate ($PO_4^{3-}$) form for growth. In deep stratified bodies of water, there is a limited replenishment of phosphate and the quantity of "available" phosphorus in late winter may determine the level of phytoplankton growth that can develop in the summer. Intensive algal growth in spring usually depletes phosphate to levels in the surface waters. Hence, phytoplankton growth during the summer usually occurs using phosphate excreted by animals feeding on phytoplankton. Direct sediment resupply is important in the summer in shallow areas.

Rooted aquatic plants often obtain large quantities of phosphorus from the sediments and can release large amounts into the water. When phosphate levels are low in surface waters, phytoplankton excrete extracellular enzymes called alkaline phosphatases, which have the ability to free phosphate bound to organic molecules. Since phosphate (in contrast to nitrate) is readily adsorbed to soil particles and does not move easily with groundwater, high inflows of total phosphorus are due to erosion of particles from steep slopes with easily erodible soils. Intensive algal growth in spring usually depletes lake phosphate to low levels. Agricultural, domestic, and industrial wastes are major sources of soluble phosphate and frequently contribute to lake eutrophication and algal blooms. Eutrophication is thus the process where first the sediment (including the water contained therein) of a body of water such as a lake will become anaerobic, and thereafter the deep water, since all oxygen is used up when the organic material is degraded. Deep water (or profundal) is the offshore zone within a body of water where water depths are greater than the depth to which sunlight can penetrate to support aquatic plants, in contrast with the littoral zone closer to shore.

Adverse and unwanted environmental effects of the eutrophication of lakes, ponds and rivers are amongst others
dead fish due to toxic $H_2S$ and sulfide;
$H_2S$ bubbles arising from the sediment of the body of water, creating a bad and harmful odor;
bloom of blue green algae;
a black and stinking sediment;
poor visibility in the water.

In artificial ponds that are for instance used to discharge industrial wastewater coming from the fertilizer industry, also the problem of high production of hydrogen sulfide can occur since there is not enough or even no aeration of such ponds.

Also shallow lakes or other flat waters may get temporarily anoxic under special conditions. Anoxic milieus may for instance be caused by storm water pollution or under other conditions of lake restoration measures such as removal of sludge, when the oxygen demand raises by organic material that is set free.

There exists therefor the need to restore and remediate anoxic bodies of water, and more in particular to restore and remediate anoxic bodies of water forming the bottom part of thermally stratified bodies of water such as thermally stratified lakes, ponds and rivers, or to restore and remediate anoxic bodies of water being contained in the sludge or sediment layer of a body of water.

At present, there are already many solutions available to control eutrophication by minimizing the nutrient inflows. There also exist EU requirements for surface water quality demanding reduction in nutrients, and especially phosphate, in the water body (2000/60/EG). However, often organic loads, acidity, salinity or contamination with hazardous substances need to be controlled. The amendment of the conditions may be different, and in some cases, contrary to the technologies developed to control eutrophication.

Another solution to control eutrophication is the application of different in-situ remediation techniques. An "in-situ" treatment involves applying treatment amendments onto or into surface sediments. An-in situ treatment of a lake is also called an "in-lake" restoration/remediation/treatment technique.

Hypolimnetic aeration (also called deep water aeration) is an in-situ water treatment technique wherein the oxygen demand of deep water is covered by oxygen from the atmosphere without destroying the lake's natural stratification. The deep water thus gets aerobic, the phosphate dissolution is reduced significantly and the mineralization of the sediments improves. An example of a hypolimnetic aeration system is TIBEAN™ by the company Polycon. The TIBEAN™-series are floating plants consisting of
one or more upstream pipes, where the water is aerated while rising up;
a degassing chamber where the aerated water is freed of gases; and
one or more downstream pipes where the vented, degassed water is pumped back into the hypolimnion.

In the degassing chamber, additional nutrient absorbers and/or nutrient precipitation devices are implementable.

At the lower end of the floating plant, atmospheric air is inserted into the water by an ejector. A mixture of water and oxygen is forced upwards in the upstream pipe. At the end of the upstream pipe, the mixture flows into the degassing chamber. Residual gases are separated from the oxygenated water. The gas escapes into the atmosphere, the oxygenated water flows back through the downstream pipe. The outlet provides a laminar flow and a horizontal flow into the hypolimnion.

Disadvantages of the hypolimnetic aeration system as described above are the limited solubility of oxygen in water and therefore the need of continuous application and operation of such a unit. This might compromise the use of a lake, pond or river for leisure and of course causes permanent costs.

Yara International ASA already commercializes an "in situ" remediation technique called "Limnox" to prevent fouling of sludge in lakes. In this Limnox remediation technique, a calcium nitrate solution with a calcium nitrate content of 50 weight % is added to the lake. Before the application of Limnox, a survey of the lake must be conducted to identify the major factors causing the problems.

Depending on the desired effects, the calcium nitrate solution is mixed into parts of or the entire body of water or applied directly to the sediment of the lake. Mixing into the water is the preferred method for inhibiting cyanobacteria and also gives beneficial effects when used in small, shallow lakes. The sediment applications are more economical in bigger, deeper lakes. A comblike device is provided to release Limnox can be used to apply it to the sediment. A high density Limnox, i.e. 1.5 kg/l is applied in order to remain stable on the lake bed and to allow even penetration of the sediment. This is particularly important for sediments that are contaminated with toxic substances where any disturbance is undesirable. A layer of Limnox on the sediment keeps the redox potential high and the phosphorus bound. Phosphate is extremely reactive and interacts with many cations like iron to form relatively insoluble compounds that precipitate out of the water, especially under oxidising conditions. Thus, aerobic sediments normally act as a sink for phosphorus. Precipitated phosphorus compounds however become soluble again under anaerobic conditions. Since Limnox keeps the phosphorous bound, self-eutrophication of the lake is prevented. Furthermore, it is claimed that Limnox takes care that the natural stratification of a lake is maintained.

Disadvantages of Limnox are the challenging application in the sediment that also touches all animals and plants in that layer, the effort to precisely apply the aqueous calcium nitrate solution evenly and the loss of aqueous calcium nitrate solution due to currents in the lake which dilute the nitrate solution layer and transport nitrate into higher water body layers.

It is consequently a purpose to provide in a simple and reliable restoration and/or remediation technique of an anoxic body of water that can be permanently sustained and that leads to a water quality that is in accordance with the quality of natural healthy waters, without the stresses that cause degradation, i.e. having a good ecosystem health, long-term stability and sustainability.

In case a natural thermally stratified body of water such as a natural lake or pond or a river is treated, it is a further purpose to maintain the natural stratification of natural ponds or lakes and rivers when these are restored and/or remedied.

SUMMARY OF THE INVENTION

The present application is generally related to methods and systems for remediation and/or restoration of a body of water comprising an anoxic body of water, According to a first aspect, a method for remediation and/or restoration of an anoxic body of water is disclosed, wherein a calcium nitrate solution is added to the anoxic body of water, and wherein the method comprises the steps of mixing water having a percent of oxygen saturation of between 50% and 150% with the calcium nitrate solution, resulting in a mixture; and pumping the mixture into the body of water, particularly the anoxic body of water, wherein or until the final concentration of nitrate-N in the remedied and/or restored anoxic body is between 1 and 20 mg/l of water. Particularly, said anoxic body of water is an underlying water layer lying below a surface water layer. Particularly, said water is taken from the surface water layer, the underlying water layer or a ground water source in the vicinity of the surface water layer, wherein said water, particularly said water from the underlying water layer or from a ground water source, is mixed with oxygen, such as in the form of atmospheric air, oxygen enriched atmospheric air or pure oxygen.

In particular embodiments, the mixing step comprises mixing water having a percent of oxygen saturation of between 75% and 125% with the calcium nitrate solution, resulting in a mixture, more particular having a percent of oxygen saturation of between 95% and 105%.

In particular embodiments, the final concentration of nitrate-N in the remedied and/or restored anoxic body is between 1 and 10 mg/l of water, more particular the final concentration of nitrate-N in the remedied and/or restored anoxic body is 1 mg/l of water, 1.5 mg/l of water, 2 mg/l of water, 2.5 mg/l of water, 3 mg/l of water, 3.5 mg/l of water, 4 mg/l of water, 4.5 mg/l of water or 5 mg/l of water.

Oxygen saturation is the potential that a body of water has for holding oxygen, based primarily on water temperature and altitude. Percent of oxygen saturation is the ratio between actual dissolved oxygen measurements and the water's potential for holding oxygen.

Nitrate-N is the part of the nitrogen that is bound to the nitrate ion.

Using a calcium nitrate solution to remedy and/or restore an anoxic body of water has the following advantages:
  the negative redox potential is altered to a positive value,
  the nutrients (mainly phosphor) are bound and are prevented from releasing and remobilization (redissolution) which leads to a better water quality by reduction of the body water's trophic state;
  the equilibrium is shifted towards aerobic processes in a natural way.

By mixing the calcium nitrate solution with water having a percent of oxygen saturation of between 50% and 150%, and in particular 100%, the natural processes of nitrification and denitrification are activated and stay activated. If only calcium nitrate solution is used, decreases of denitrification and nitrate are induced. Furthermore, when using the method as described in this application, nitrate is produced by oxidation of ammonium ($NH_4^+$), through which the pool of nitrate is longer available and the process is much better buffered.

Furthermore, the application of a calcium nitrate solution is not toxic to the aquatic system since the components that are used to treat the water body are natural.

Also, the calcium nitrate solution has a combined positive effect on the precipitation of phosphor as well as on the available amount of oxygen in the hypolimnion.

Since the addition of a calcium nitrate solution is a cost effective measure, it can be applied as a continuous measure during several periods, for instance during several summer stagnation periods, for a longer time.

In an embodiment of a method, the mixture has a concentration of calcium nitrate-N of between 10 and 1000 mg/l, depending on the volume of the anoxic body of water and the water flow in the anoxic body of water.

In an embodiment of a method, the water that is mixed with the calcium nitrate solution has a percent of oxygen saturation of between 75% and 125%, such as between 75% and 100%.

In an embodiment of a method, the water that is mixed with the calcium nitrate solution has a percent of oxygen saturation of around 100%.

In case the anoxic body of water is an underlying water layer lying below a surface water layer, in a first possible method, the water that is mixed with the calcium nitrate solution is taken from the surface water layer. In this case, the water has natural oxygen saturation. No additional aeration thereof is necessary.

In a second possible method, the water that is mixed with the calcium nitrate solution is water taken from ground water in the vicinity of the surface water layer or the underlying water layer, more specifically the surface water layer. This ground water is then mixed with oxygen to a percent of oxygen saturation of between 50% and 150%, such as between 75% and 125%, more specifically around 100%.

In a third possible method, the water that is mixed with the calcium nitrate solution is water taken from the underlying water layer. This water is mixed with oxygen to a percent of oxygen saturation between 50% and 150%, such as between 75% and 125%, more specifically around 100%.

In a possible embodiment of a method, the oxygen that is mixed with the water is originating from atmospheric air, is oxygen enriched atmospheric air or is 100% pure oxygen. Atmospheric air has a proportion of oxygen of around 21 volume %.

In an embodiment of a method, the anoxic body of water, particularly the anoxic body being or in the form of an underlying water layer, is the hypolimnion of a thermally stratified body of water.

In case the anoxic body of water forms the bottom layer of a thermally stratified body of water such as a thermally stratified lake, pond, river and the like, there are different possible sources for the water that is mixed with the calcium nitrate solution, i.e. the water can be taken from
  the epilimnion of the thermally stratified body of water. In that case, it may not be necessary to add additional oxygen to the water since the water is usually naturally saturated with oxygen. Preferably, no additional oxygen is added to the water since the water is naturally saturated with oxygen;
  the hypolimnion, wherein the water is then mixed with oxygen to a percent of oxygen saturation of between 50% and 150%, such as between 75% and 125%, more specifically around 100%;
  a ground water source in the vicinity of the thermally stratified body of water, more specifically the epilimnion, wherein the ground water is then mixed with oxygen to a percent of oxygen saturation of between 50% and 150%, such as between 75% and 125%, more specifically around 100%.

In case of a thermally stratified body of water, advantageously, the methods as described herein maintain the natural stratification of natural ponds or lakes and rivers when these are restored and/or remedied.

In an embodiment of a method, the anoxic body of water, particularly the anoxic body being or in the form of an underlying water layer, is the anoxic body of water contained in the sludge or sediment layer of a body of water, particularly at the bottom of said body of water. In such embodiment, the water that is mixed with the calcium nitrate solution (3) is particularly taken from the anoxic body of water comprised in the sludge or sediment layer and which is mixed with oxygen to a percent of oxygen saturation of between 50% and 150% such as between 75% and 125%, more specifically around 100%. Preferably, the water taken from the anoxic body of water comprised in the sludge or sediment layer is obtained by desludging a body of water and subsequent separating the water from the sludge or sediment.

Accordingly, in a preferred embodiment, a method for remediation and/or restoration of a body of water compris-ing an anoxic body of water is disclosed, wherein a calcium nitrate solution is added to the anoxic body of water, wherein the anoxic body of water is a body of water contained in the sludge or sediment layer of a body of water, and wherein the method comprises the steps of:
  desludging the body of water and/or separating the anoxic body of water from the sludge or sediment layer;
  mixing water having a percent of oxygen saturation of between 50% and 150% with the calcium nitrate solution, resulting in a mixture; wherein said water is taken from the anoxic body of water, separated from the sludge or sediment layer; and is mixed with oxygen;
  pumping the mixture into the body of water, wherein or until the final concentration of nitrate-N in the remedied and/or restored anoxic body is between 1 and 20 mg/l of water.

In an embodiment, the method comprises the step of controlling and optimizing the amount of calcium nitrate solution that has to be added to the anoxic body of water and the time when and for how long to add calcium nitrate solution to the anoxic body of water.

The amount (dosage) of calcium nitrate to be added to the anoxic body of water depends on specific properties and characteristics of the anoxic body of water to be treated. Measurements have to be made to control the demand of calcium nitrate and the phosphorous concentration in order to enable optimization of the remediation and/or restoration process.

Examples of parameters that have to be monitored in several distances versus the place where calcium nitrate is added are the amount of chloride, nitrate, nitrite, ammonia, phosphorus (the total amount and the amount of ortho-phosphorus), as well as the temperature of the water, the amount of dissolved oxygen and the redoxpotential.

In an embodiment of a method, the calcium nitrate solution comprises one or more substances (or means) for inducing or enhancing precipitation of phosphorus. Said substances or means for enhancing or inducing precipitation of phosphorous comprise or provide compounds/elements/cations which combine with phosphate and/or other phosphorous compounds in the form of a molecule or compound which is poorly soluble or insoluble in water. The particles formed in this way then settle from the water column.

Examples of such substances are Lanthanum or Ferric chloride. For example, Bentophos®, which is a lanthanum modified clay, can be added to the calcium nitrate solution.

In a preferred embodiment, the oxygen concentration in the mixing container and/or the water body is remotely controlled by a continuously measuring system. In this way, the important processes in the water treatment system and in the water body can be monitored in real time.

According to a second aspect, a system for remediation and/or restoration of an anoxic body of water is provided, wherein the system is provided with means to add a calcium nitrate solution to the anoxic body of water, in the form of a mixing device arranged to mix the calcium nitrate solution with water having a percent of oxygen saturation of between 50% and 150%, such as between 75% and 125%, specifically around 100%, resulting in a mixture, and wherein the system comprises first pumping means for pumping the mixture into the anoxic body of water. Particularly, the system further comprises an oxygen mixing means, optionally forming part of the mixing device, for mixing oxygen into the water, to obtain the water having a percent of oxygen saturation of between 50% and 150%, such as between 75% and 125%, more specifically around 100%.

In an embodiment of the system, it comprises second pumping means for pumping or pumping up the water that is to be mixed with the calcium nitrate solution towards the mixing device.

In case the anoxic body of water is an underlying water layer lying beneath a surface water layer, the second pumping means of a first possible system are provided for or configured for pumping water from the surface layer lying towards the mixing device.

In case the anoxic body of water is an underlying water layer lying beneath a surface water layer, the second pumping means of a second possible system are provided for or configured for pumping ground water out of a ground water source that is situated in the vicinity of the surface water layer or the underlying water layer, more specifically the surface water layer, towards the mixing device.

In case the anoxic body of water is an underlying water layer lying beneath a surface water layer, the second pumping means of a third possible system are provided for or configured for pumping water from the underlying water layer itself towards the mixing device.

In case the anoxic body of water is an underlying water layer lying beneath a surface water layer of a body of water, such as wherein the anoxic body of water (in the form of an underlying water layer) is an anoxic body of water contained in a sludge or sediment layer of a body of water, the second pumping means of a fourth possible system are provided for or configured for pumping water separated from a sludge or sediment layer of said body of water towards the mixing device. In an embodiment, the system may further comprise desludging means for removing the sludge or sediment layer of a body of water and, preferably, means for separating the anoxic body of water from the sludge or sediment layer, such as filters and the like.

Particularly in the three latter cases, the system comprises oxygen mixing means for mixing oxygen into the ground water, the underlying water layer, or the anoxic water separated from a sludge or sediment layer.

These oxygen mixing means for mixing oxygen into the ground water or the underlying water layer preferably form part of the mixing device.

In case the anoxic body of water is the hypolimnion of a thermally stratified body of water, the thermally stratified body of water comprising an epilimnion, the second pumping means of a first possible embodiment of a system are provided for or configured for pumping water from the epilimnion towards the mixing device.

In case the anoxic body of water is the hypolimnion of a thermally stratified body of water, the second pumping means of a second possible embodiment of a system are provided for or configured for pumping up ground water out of a ground water source that is situated in the vicinity of the thermally stratified body of water, more specifically the epilimnion of the thermally stratified body of water, towards the mixing device.

In case the anoxic body of water is the hypolimnion of a thermally stratified body of water, the second pumping means of a third possible embodiment of a system are provided for or configured for pumping water from the hypolimnion towards the mixing device.

Particularly in the two latter cases, the system comprises oxygen mixing means for mixing oxygen into the ground water or the hypolimnion.

More specifically, the oxygen mixing means for mixing oxygen into the water, particularly in the ground water or the hypolimnion form part of the mixing device.

In an embodiment of a system, the mixing device forms part of an onshore station.

The system is more specifically arranged to perform a method as described above.

In an embodiment of a system, the mixing device forms part of an onshore station.

"Onshore" means "on the land". Although the mixing device can also be placed offshore (meaning on a boat or a ship or a barge), placing it onshore is preferably since not every water is ever navigable by ships;

suitable for longer-term therapy of the anoxic body of water with an intermittent operation of calcium nitrate-solution supply during summer stagnation period. A permanent assembly and dismantling of the technical installation is not required.

better suited for an operation with a remote-controlled dosage.

As a result, with an onshore station, the number of possible applications increases.

In particular embodiments, the system for remediation and/or restoration of an anoxic body of water is arranged to perform a method as described herein, wherein the system is provided with means to add a calcium nitrate solution to the anoxic body of water, wherein the means to add the calcium nitrate solution to the anoxic body of water comprises a mixing device arranged to mix the calcium nitrate solution with water having a percent of oxygen saturation of between 50% and 150%, such as between 75% and 125%, specifically around 100%, resulting in a mixture, and wherein the system further comprises first pumping means for pumping the mixture into the body of water, particularly in the anoxic body of water, and optionally second pumping means for pumping or pumping up the water that is to be mixed with the calcium nitrate solution towards the mixing device.

Another aspect provides for the use of a calcium nitrate solution mixed with water having a percent of oxygen saturation of between 50% and 150%, such as between 75% and 125%, preferably around 100%, for prevention of a reducing environment having a negative redox potential and with anoxic biological processes in an anoxic body of water. Preferably, said anoxic body of water is an underlying water layer beneath a surface water layer. In certain embodiments, said anoxic body of water is the hypolimnion of a thermally stratified body of water. In certain embodiments, said anoxic body of water is the anoxic body of water contained in the sludge or sediment layer of a body of water.

Another aspect provides for the use of a calcium nitrate solution mixed with water having a percent of oxygen saturation of between 50% and 150%, preferably around 100%, for the binding and prevention of release and remobilization of nutrients out of an anoxic body of water. Preferably, said anoxic body of water is an underlying water layer beneath a surface water layer. In certain embodiments, said anoxic body of water is the hypolimnion of a thermally stratified body of water. In certain embodiments, said anoxic body of water is the anoxic body of water contained in the sludge or sediment layer of a body of water.

DETAILED DESCRIPTION OF THE INVENTION

Figure 1:
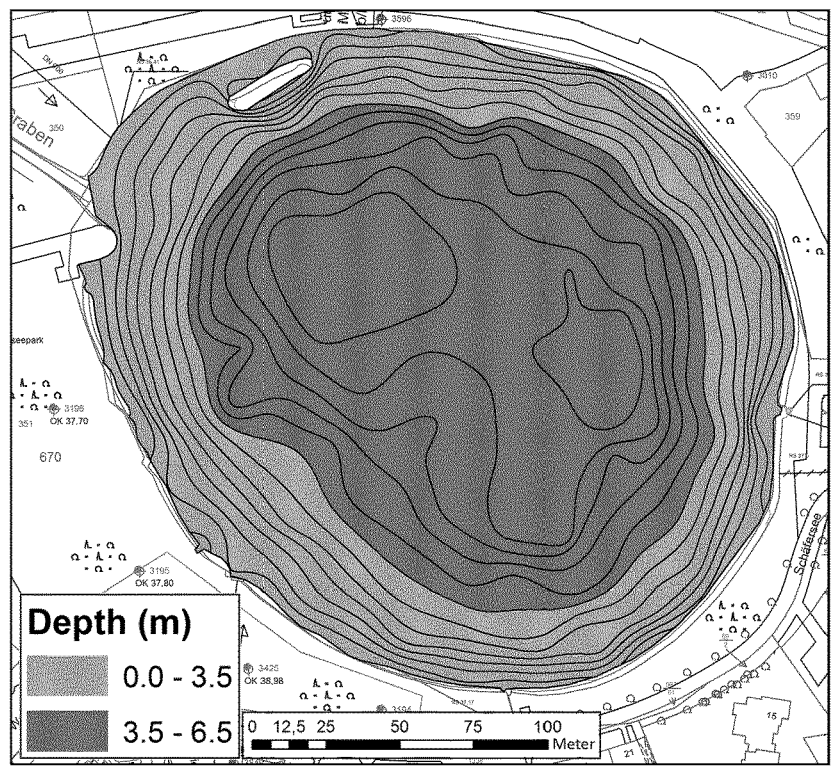
FIG. 1 shows a bathymetric chart of Lake Schafersee in Berlin Reinickendorf, in which the depth contours are shown in 0.5 meter increments, and in which the partial desludged area above 3.5 meter is in light grey, while the deeper non-desludged area below 3.5 meter is in dark grey.

The present invention relates to a method for remediation and/or restoration of an anoxic body of water, particularly for remediation and/or restoration of a body of water comprising an anoxic body of water wherein the anoxic body of water is an underlying water layer lying below a surface water layer, wherein a calcium nitrate solution is added to the anoxic body of water, wherein the method comprises the steps of mixing water having a percent of oxygen saturation of between 50% and 150% with the calcium nitrate solution, resulting in a mixture; and pumping the mixture into the body of water, preferably the anoxic body of water.

In particular embodiments, the water having a percent of oxygen saturation as defined herein is taken from the surface water layer, the underlying water layer or a ground water source in the vicinity of the surface water layer and is subsequently mixed with oxygen via an oxygen mixing means. In more particular embodiments, the water having a percent of oxygen saturation as defined herein is taken from the underlying water layer or a ground water source in the vicinity of the surface water layer and is subsequently mixed with oxygen via an oxygen mixing means. In particularly preferred embodiments, the water having a percent of oxygen saturation is taken from an underlying water lying beneath a surface water layer, such as the hypolimnion of a thermally stratified body of water or the anoxic water layer contained in the sludge or sediment layer of a body of water.

In particular embodiments the mixing step comprises mixing water having a percent of oxygen saturation of between 75% and 125% with the calcium nitrate solution, resulting in a mixture, more particular having a percent of oxygen saturation of between 95% and 105%.

The final concentration of nitrate-N in the remedied and/or restored anoxic body should preferably not exceed 5 mg/l of water, in particular between 1 and 5 mg/l of water, such as for instance 1 mg/l of water, 2 mg/l of water, 3 mg/l of water, 4 mg/l of water or 5 mg/l of water.

The calcium nitrate solution that is used to remedy and/or restore the anoxic body of water can have different concentrations, preferably ranging between 5 and 55 weight % calcium nitrate solutions, more preferably between 35 and 55 weight % calcium nitrate solutions, such as for instance 40 weight %, 42.5 weight %, 45 weight %, 47.5 weight %, 50 weight %, 51 weight %, 52 weight %, 53 weight %, 54 weight % or 55 weight % calcium nitrate solutions. The most commonly used calcium nitrate solution is a 45 weight % calcium nitrate solution. In countries with a warmer climate, also 51 to 52 weight % calcium nitrate solutions can be used. There however also exist other calcium nitrate solutions such as 8 weight % calcium nitrate solutions. It is a fact that a higher concentration is more useful to treat bigger volumes of water.

The mixture of water and calcium nitrate has preferably a concentration of calcium nitrate-N of between 10 mg/l and 1000 mg/l, depending on the volume and the flow of the hypolimnion.

An anoxic body of water most commonly occurs as an underlying water layer lying beneath a surface water layer or a surface water layer and one or more other water layers, such as e.g. the hypolimnion in a thermally stratified body of water, or the water layer contained in the sludge or sediment layer of a body of water. This does however not take away the fact that under certain circumstances, also a flat body of water can be completely anoxic.

Figure 18:
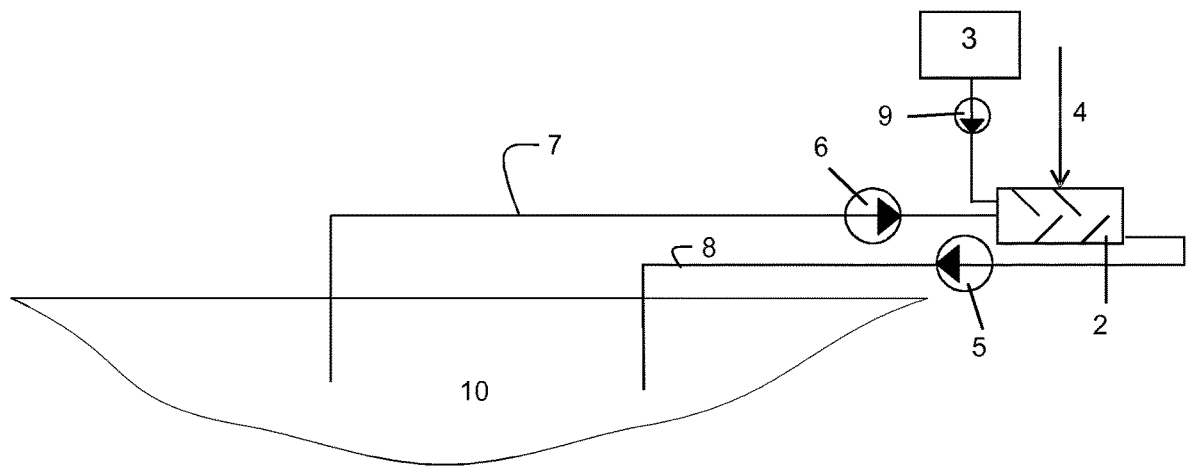
FIG. 18 provides is a graphical representation of an embodiment of a system for remediation and/or restoration of an anoxic body of water, wherein water from the anoxic body of water is pumped out of the body of water and is mixed with calcium nitrate solution and oxygen, the mixture being pumped back into the anoxic body of water.

As can be seen in the embodiment represented in FIG. 18, in case an anoxic body of water (10) existing out of one layer has to be remedied and/or restored, water is pumped out of the anoxic body of water (10) itself by means of a second pumping means (6) that is provided for pumping water via a piping (7) to a mixer (2). In this mixer (2), the water that is pumped out of the anoxic body of water (10) is mixed with calcium nitrate solution (3), which is pumped via a pump (9) into the mixer (2), and oxygen, such as air or pure (100%) oxygen (4) is added until water is obtained having an oxygen saturation of between 50% and 150%, and more particularly 100%. The second pumping means (6) for instance are in the form of hydraulic pump means. The mixer (2) for instance is in the form of a mechanical mixing means. The mixture coming out of the mixer (2) is then pumped via piping (8) using a first pumping means (5) into the anoxic body of water (10). This process is done until the final concentration of nitrate-N in the treated anoxic body of water (10) is between 1 to 20 mg nitrate-N per liter water, and more specifically between 1 and 5 mg nitrate-N per liter water.

To remedy and/or restore anoxic bodies of water (10) forming an underlying water layer, water from different sources can be used to be mixed with the calcium nitrate solution. It is possible to mix already naturally oxygen saturated water from the surface (upper) layer of water with the calcium nitrate solution. No additional aeration of such water is necessary.

It is furthermore also possible to mix water from the underlying water layer (or anoxic body of water, such as e.g. water from the hypolimnion or from the sludge or sediment layer) itself or ground water from a ground water source that is situated in the vicinity of the underlying water layer with the calcium nitrate solution. In these two cases, there will not be sufficient oxygen in the water to activate and keep activated the nitrification and denitrification process, and thus, additional oxygen, preferably 100% pure oxygen, has to be mixed with the calcium nitrate solution and the water of the underlying body of water or the ground water.

The method according to the invention is typically applicable to remedy and/or restore the bottom layer of a thermally stratified body of water. Thermal stratification of water bodies refers to a change in the temperature at different depths in the water body, and is due to the change in water's density with temperature. Thermal stratification typically occurs in lakes, but can also occur in ponds, rivers and the like.

Figure 19:
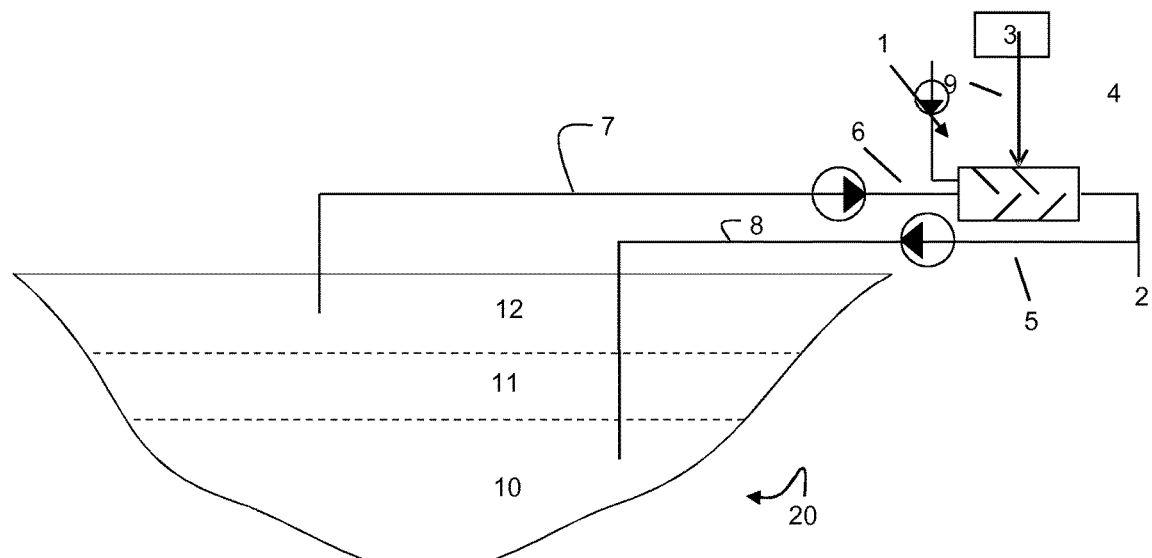
FIG. 19 provides a graphical representation of a first embodiment of a system for remediation and/or restoration of the hypolimnion of a thermally stratified body of water, wherein water is pumped out of the epilimnion of the thermally stratified body of water and is mixed with calcium nitrate solution, the mixture being pumped back into the hypolimnion.
Figure 20:
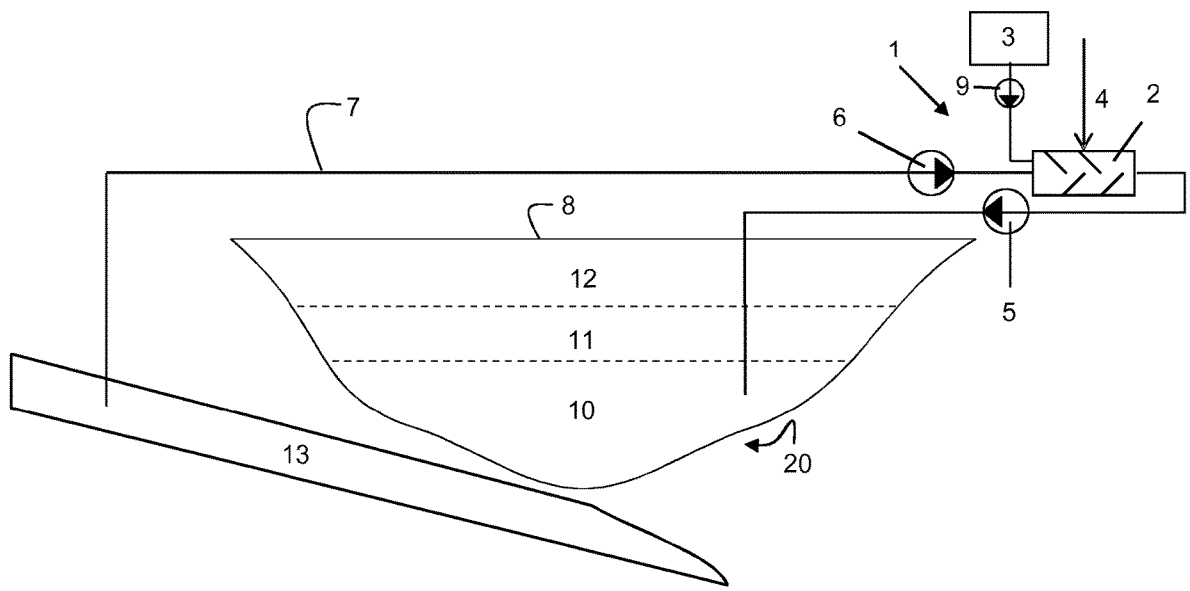
FIG. 20 provides a graphical representation of a second embodiment of a system for remediation and/or restoration of the hypolimnion of a thermally stratified body of water, wherein groundwater is pumped out of a groundwater source located in the vicinity of the epilimnion of the thermally stratified body of water and is mixed with oxygen and calcium nitrate solution in a mixing device, the mixture being pumped back into the hypolimnion of the thermally stratified body of water.
Figure 21:
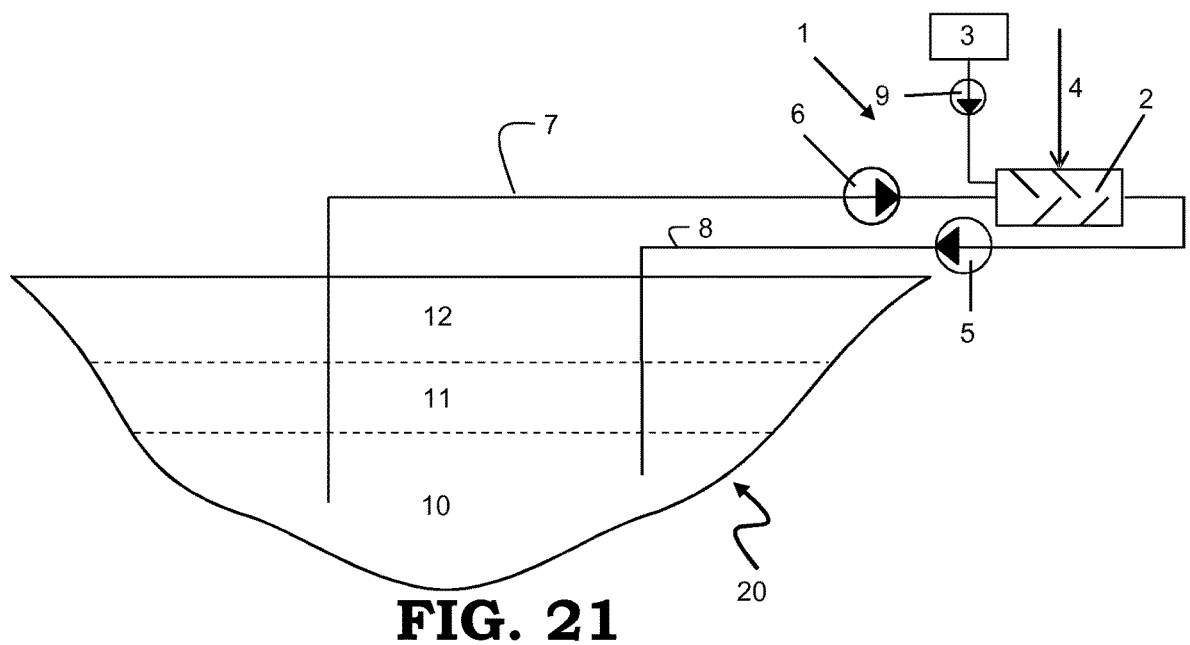
FIG. 21 provides a graphical representation of a third embodiment of a system for remediation and/or restoration of the hypolimnion of a thermally stratified body of water, wherein water is pumped out of the hypolimnion and is mixed with oxygen and calcium nitrate solution in a mixing device, the mixture being pumped back into the hypolimnion.

As can be seen in the different embodiments represented in FIGS. 19 to 21, a thermally stratified body of water (20) in general exists of
 a hypolimnion (10), the bottom layer;
 a metalimnion or thermocline (11), the middle layer that may change depth throughout the day; and
 an epilimnion (12), the upper or surface layer.

In case the method is to be applied on a thermally stratified body of water (20), the water that is mixed with the calcium nitrate solution (3) can be taken either form the epilimnion (12) (see FIG. 19), either from the hypolimnion (10) (see FIG. 21), either from groundwater (13) in the vicinity of the epilimnion (12) of the lake (20) (see FIG. 20), or from water separated from the sludge or sediment layer. Whatever water is used, it has to have a percentage of oxygen saturation of between 50% and 150%, more specifically around 100%. Since epilimnic water usually is saturated around 100% with oxygen, it is not necessary to have an additional aeration. The aeration treatment step is in that case dispensable or optional. When however groundwater or water from the hypolimnion or separated from the sludge or sediment is used, oxygen, preferably in the form of 100% pure oxygen, is preferably mixed with the water that is mixed with the calcium nitrate.

In particular embodiments, the system (1) for the remediation and/or restoration of an anoxic body of water, more specifically the hypolimnion (10) of a thermally stratified body of water (20), is provided with a mixing device (2), which is arranged to mix the calcium nitrate solution (3) with the water having a percent of oxygen saturation of between 50% and 150%, resulting in a mixture. The system (1) comprises first pumping means (5) for pumping the resulting mixture into the anoxic body of water, more specifically the hypolimnion (10).

The system (1) further comprises second pumping means (6) for pumping (up) the water that is mixed with the calcium nitrate solution (3) via piping (7). These second pumping means (6) can either be provided for pumping
 (oxygenated) water from underlying water layer the epilimnion (12), as shown in FIG. 19;
 (oxygen-poor) ground water (13) situated in the vicinity of the underlying or surface water layer more specifically the surface water layer, as shown in FIG. 20; or
 (oxygen-depleted) water from the underlying water layer hypolimnion (10) itself, as shown in FIG. 21; or
 (oxygen-depleted) water from the sediment layer as underlying water layer.

Typically, the system further comprises an oxygen mixing means for mixing oxygen (4) into the water. Particular in case the water that is to be mixed with the calcium nitrate solution (3) is pumped out of underlying water layer the hypolimnion (10) or the sediment layer, or ground water (13), the system (1) also comprises oxygen mixing means for mixing oxygen (4) into that water. In an embodiment, these oxygen mixing means form part of the mixing device (2). As can be seen on FIGS. 20 and 21, the water from the hypolimnion (10) or the ground water (13) is preferably first mixed with oxygen (4) in order to elevate the percent of oxygen saturation to between 50% and 100%, most specifically approximately 100%, and then mixed with the calcium nitrate solution (3), and finally pumped back into underlying water layer the hypolimnion (10) via a piping (8) using the first pumping means (5). The mixture is pumped back into the hypolimnion (10) in a way to minimally disorder the thermal stratification of the water body (20).

The mixing device (2) preferably forms part of an onshore (land) station.

In particular embodiments, the system for remediation and/or restoration of a body of water comprising an anoxic body of water is arranged to perform a method as described herein, wherein the system is provided with means to add a calcium nitrate solution to the anoxic body of water, wherein the means to add the calcium nitrate solution to the anoxic body of water comprises a mixing device arranged to mix the calcium nitrate solution with water having a percent of oxygen saturation of between 50% and 150%, resulting in a mixture, and wherein the system further comprises first pumping means for pumping the mixture into the body of water and optionally second pumping means for pumping up the water that is to be mixed with the calcium nitrate solution towards the mixing device.

Another aspect provides for the use of a calcium nitrate solution mixed with water having a percent of oxygen saturation of between 50% and 150%, preferably around 100%, for prevention of a reducing environment having a negative redox potential and with anoxic biological processes in an anoxic body of water and/or for the binding and prevention of release and remobilization of nutrients, particularly phosphor out of an anoxic body of water.

The present invention will be now described in more detail referring to an example that is not limitative to the scope of the invention.

EXAMPLES

Example 1

Partial desludging of Lake Schäfersee in Berlin, Reinickendorf, covered in the years 2013-2014, the riparian area to a depth of 3.5 meter. The lake had a maximum depth of 6-7 meter. The total area of the lake was 4.14 hectare. The area to be desludged made part of about 1.55 hectare. Thus, as can be seen in FIG. 1, in the restoration project, a big part of the lake with an area of 2.6 hectare, corresponding to about 63% of the total floor are, was not covered by the desludging process. With regards to this non-desludged area, it concerned a volume of hypolimnion of around 50,000 m$^3$ and made a bit less than ⅓$^{rd}$ of the total volume of 170,000 m$^3$. The water investigation, carried out by Büro Wassmann from Borgsdorf in July 2013, prior to the restoration, showed a significant oxygen deficiency in the deepwater area (hypolimnion). Associated decay processes in the form of hydrogen sulfide production were confirmed by a negative redox potential. Furthermore, the reducing environment promoted redissolution of nutrient, in particular from phosphorus, from the sediment, which affected the worsening trophic state. A desludging of the areas below a depth of 3.5 meter would have been possible, but also a very costly measure.

Figure 2:
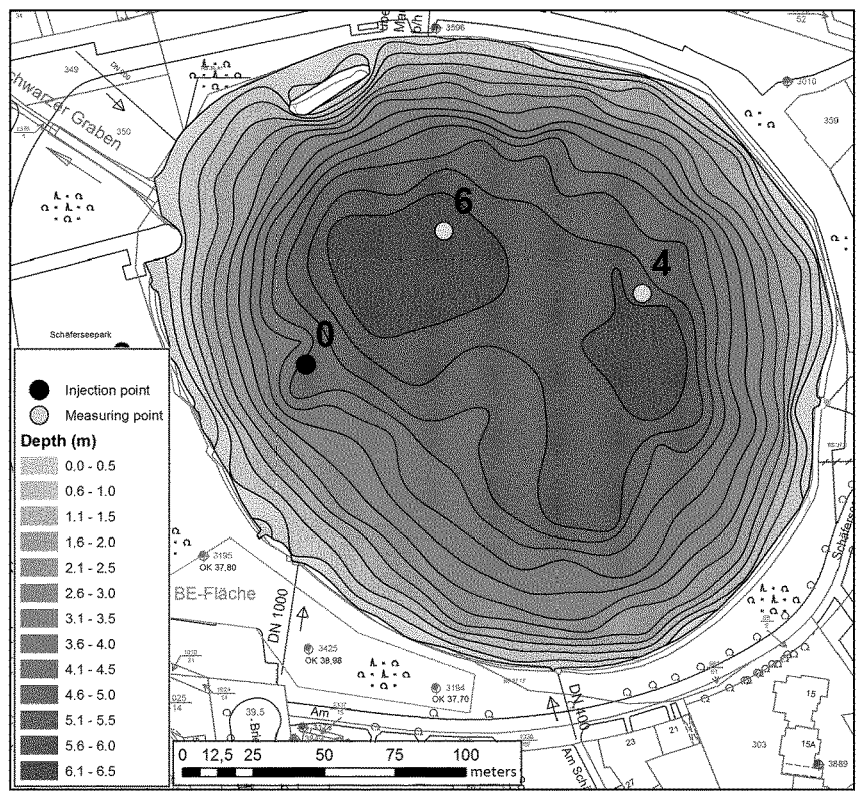
FIG. 2 shows a bathymetric chart of Lake Schafersee which the positions of the injection of a 45 weight % solution of calcium nitrate (position 0) and the measuring points numbers 4-6.

Therefore, in addition to partial desludging, of the less deep part of the lake, the deep water part of the lake was treated with a predefined concentration of nitrate-N. For these tests, the monitored discharge of treated water having a depth of 5 meter was developed. In order to determine an efficient concentration of calcium nitrate for the treatment of the deep water, laboratory experiments were carried out with four sediment cores having a depth of 7 meters and using different start concentrations of nitrate-N. A discharging period of nitrate of three weeks into the hypolimnion was applied. For the treatment, a final concentration of 5 mg/l nitrate-N was aimed for. A pre-diluted concentration of 100 mg/l calcium nitrate was used. The concentration of the nitrate and other parameters were at least weekly checked at several measuring points to examine the depth and the spatial distribution. In FIG. 2, the positions of the injection and the measuring points in the Schafersee are shown.

Figure 3:
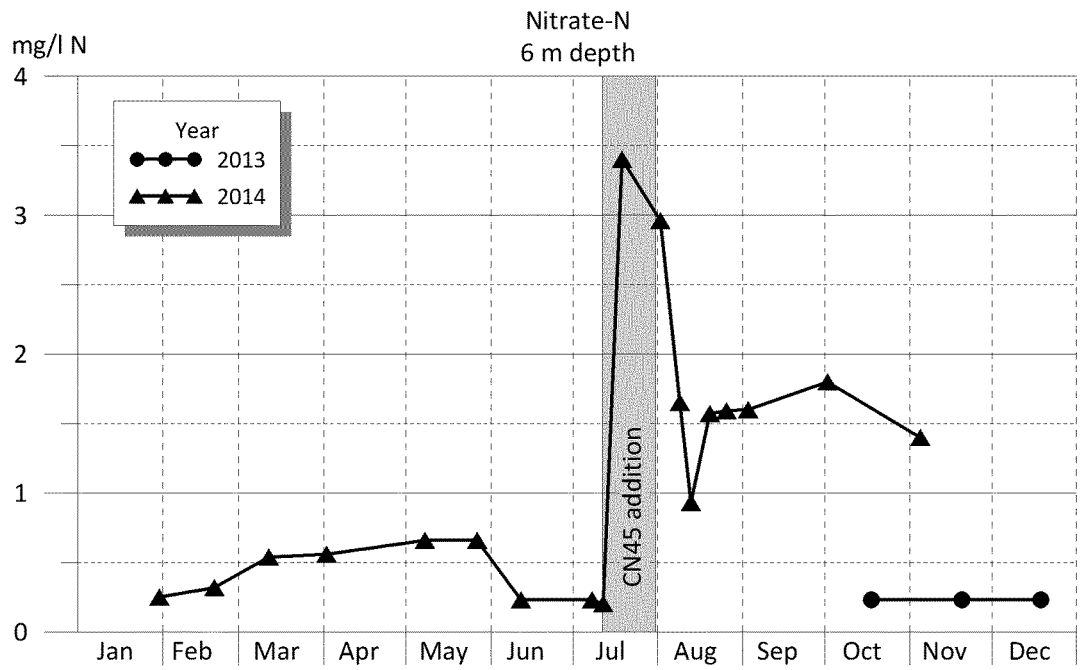
FIG. 3 shows a graph with the comparison of annual variations of the nitrate-N concentration in the years 2013 and 2014 in the measuring point 6 of Lake Schafersee as indicated in FIG. 2.

On FIG. 3, it can be seen that the concentration of nitrate was at the measuring point 6 in deep water at 6 meters in June below the detection limit of 0.23 mg/l nitrate-N. A few days after discharging, the concentration of calcium nitrate was 3.4 mg/l nitrate-N on 18 Jul. 2014. After completion of the preliminary phase, the concentration was reduced to mid-August to 0.93 mg/l nitrate-N. Surprisingly, the nitrate concentration increased until the end of August and remained at this level up to the end of the measuring phase in November at 1.5 mg nitrate-N/l water. To the contrary, under untreated conditions in the fall of 2013 from October to December, no nitrate was detected (the nitrate-N concentration was below the detection limit of 0.23 mg/l), what is representing a normal state of the deep water in the Schafersee.

Figure 4:
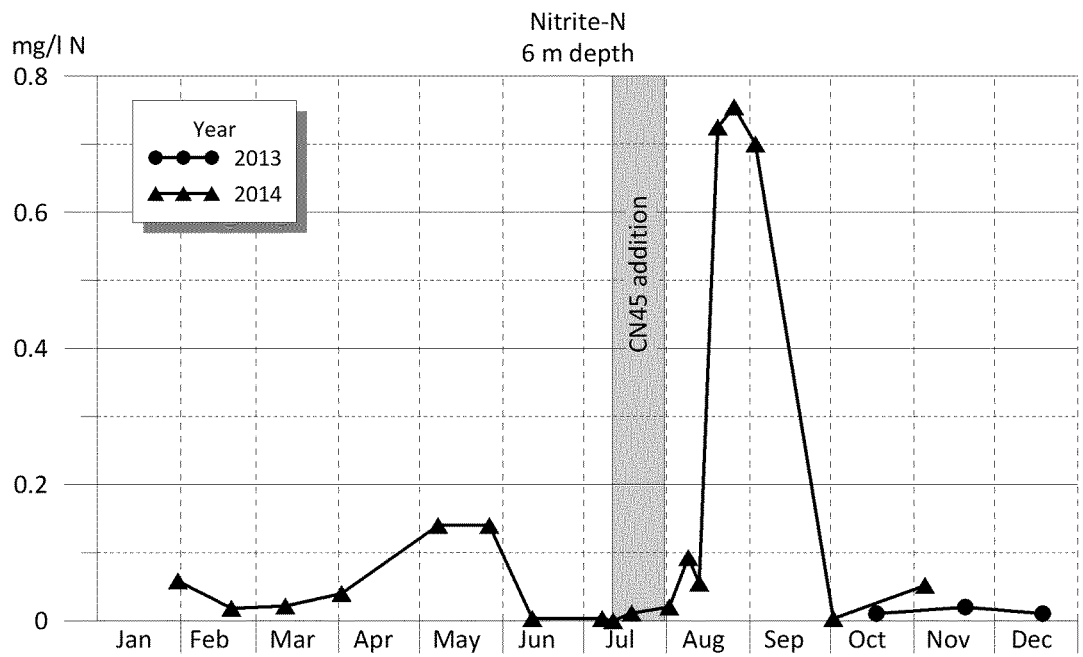
FIG. 4 shows a graph with a comparison of the annual variations of nitrite-N concentration in the years 2013 and 2014 in the measuring point 6 of Lake Schafersee as indicated in FIG. 2.
Figure 5:
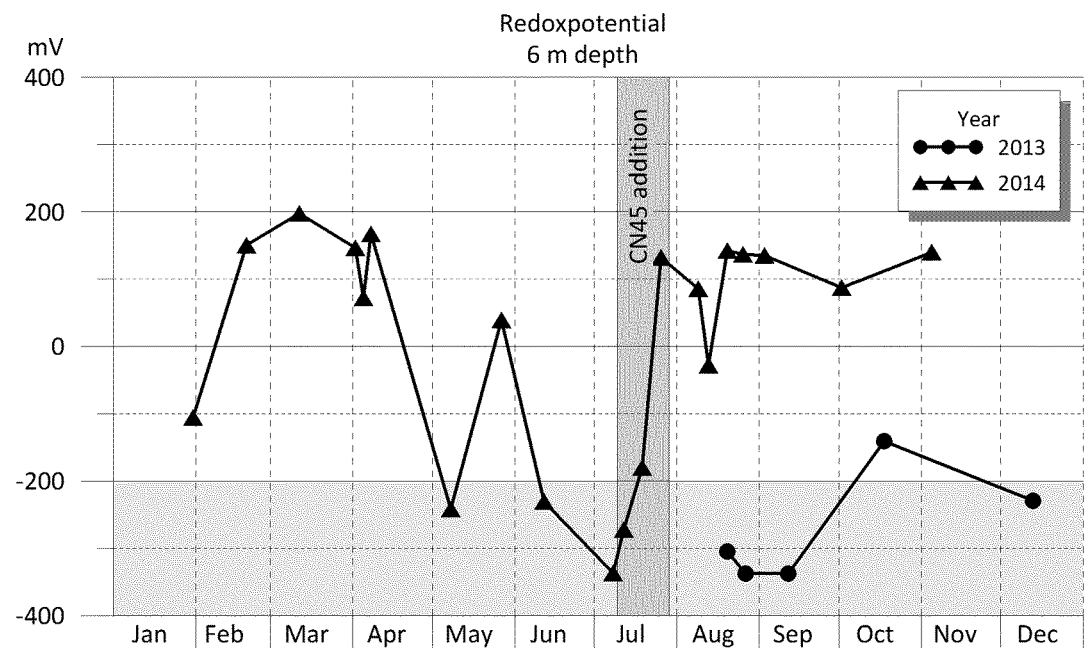
FIG. 5 shows a graph with a comparison with annual variations of the redox potential in the years 2013 and 2014 in the measuring point 6 of Lake Schafersee as indicated in FIG. 2.

The application of nitrate led to the formation of nitrite. As can be seen in FIG. 4, this appeared from mid-August 2014 and reached a maximum concentration of about 0.75 mg/l nitrite-N, remaining well below the defined maximum value of 1 mg/l nitrate-N. The normal state in the deep water of the Schafersee is the development of an anoxic milieu also indicated by a negative redox potential. As can be seen in FIG. 5, investigations from July 2013 to July 2014 showed a negative redox potential in the summer months, which probably appear every year. So, a negative redox potential was observed with oxygen deficiency in the deep water at the beginning of the studies in August and September 2013. At the end of spring 2014, the lake developed reducing conditions and declining oxygen concentrations in the deep water. In June and July 2014, the redox potential was strongly negative.

As can be seen in FIG. 5, after the beginning of the initiation phase of calcium nitrate in July 2014, the redox potential changed within a few days into positive values and remained stable at this level until the end of the measuring phase in November 2014.

Figure 6:
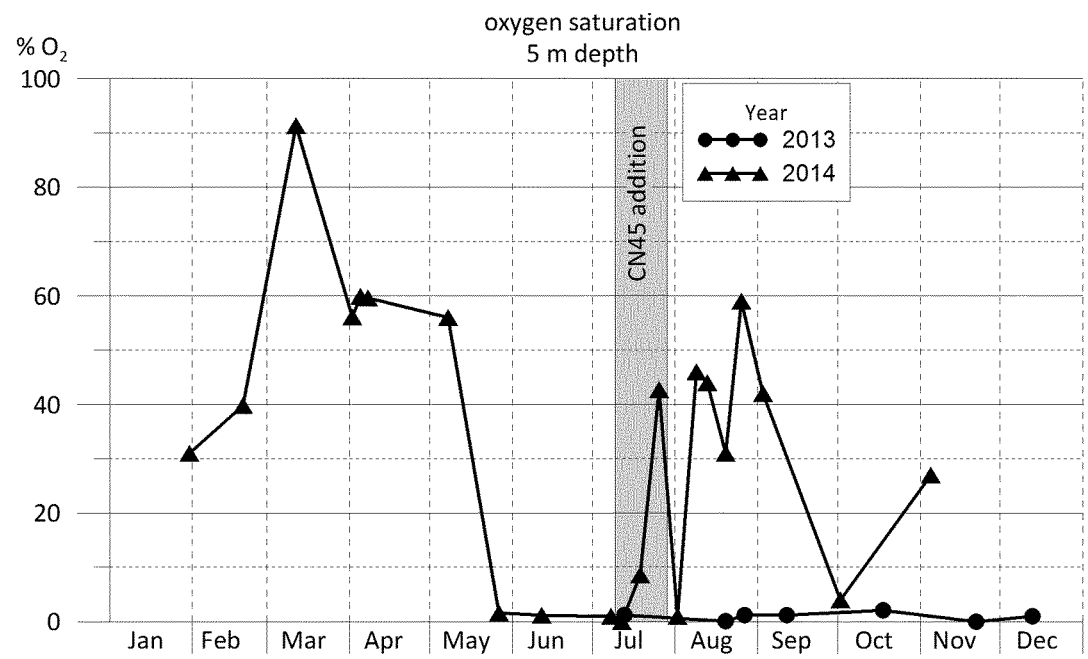
FIG. 6 shows a graph with a comparison of annual cycles of oxygen saturation in the years 2013 and 2014 in the measuring point 6 of Lake Schafersee as indicated in FIG. 2.
Figure 7:
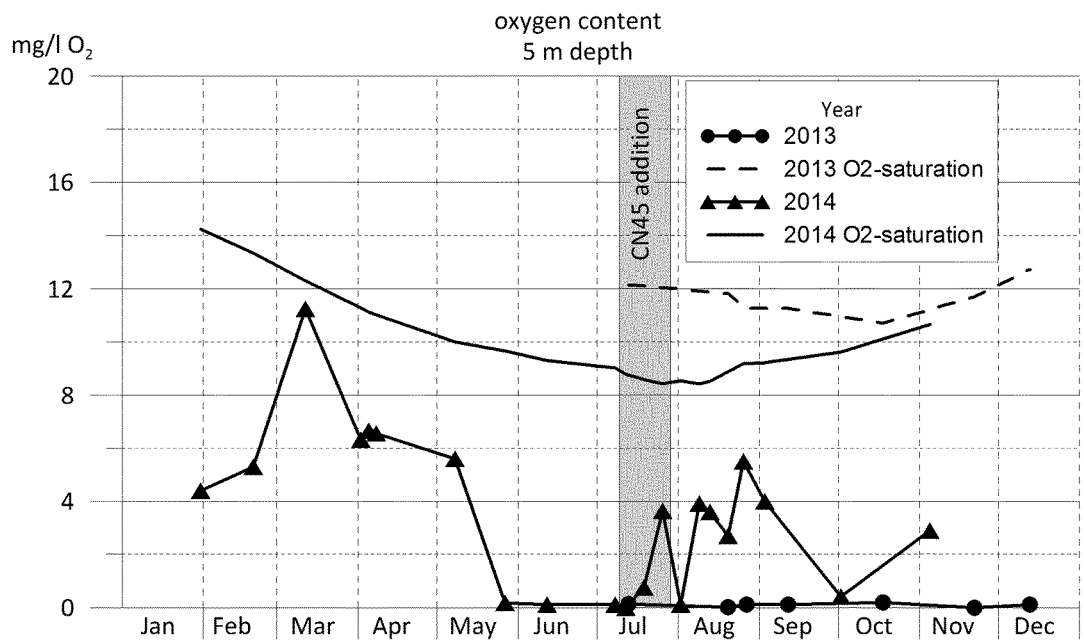
FIG. 7 shows a graph with a comparison of annual variations of total phosphorus P-concentration in the years 2013 and 2014 in the measuring point 6 of Lake Schäfersee as indicated in FIG. 2.

As can be seen in FIGS. 6 and 7, along with the increasing nitrate concentration and the positive redox potential, also a change of the oxygen conditions was observed. As can be seen in FIG. 6, the oxygen concentration was in the range of 2-5 mg/l in 5 meter depth from July to September. This is however not caused by the pure nitrate application, but rather as a side effect of the discharge of oxygen-enriched water into the deep water. The long-lasting effect is however remarkable because the application of calcium nitrate was terminated at the end of July and no more molecular oxygen was supplied.

Figure 8:
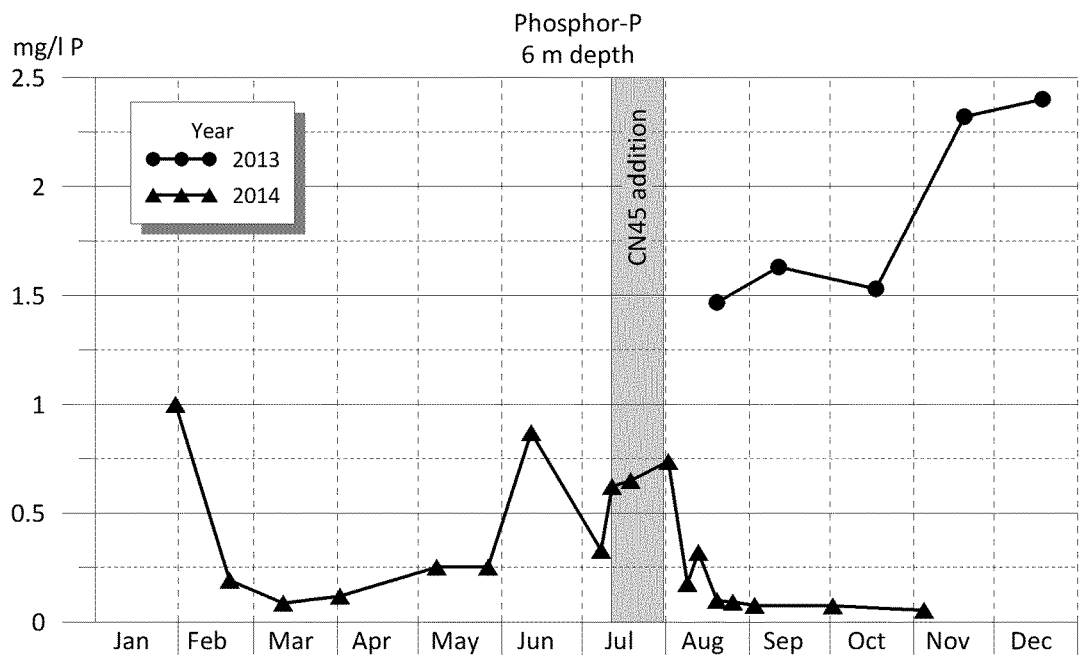
FIG. 8 shows a graph with a comparison of annual variations in the oxygen content in the years 2013 and 2014 in the measuring point 6 of Lake Schafersee as indicated in FIG. 2.
Figure 9:
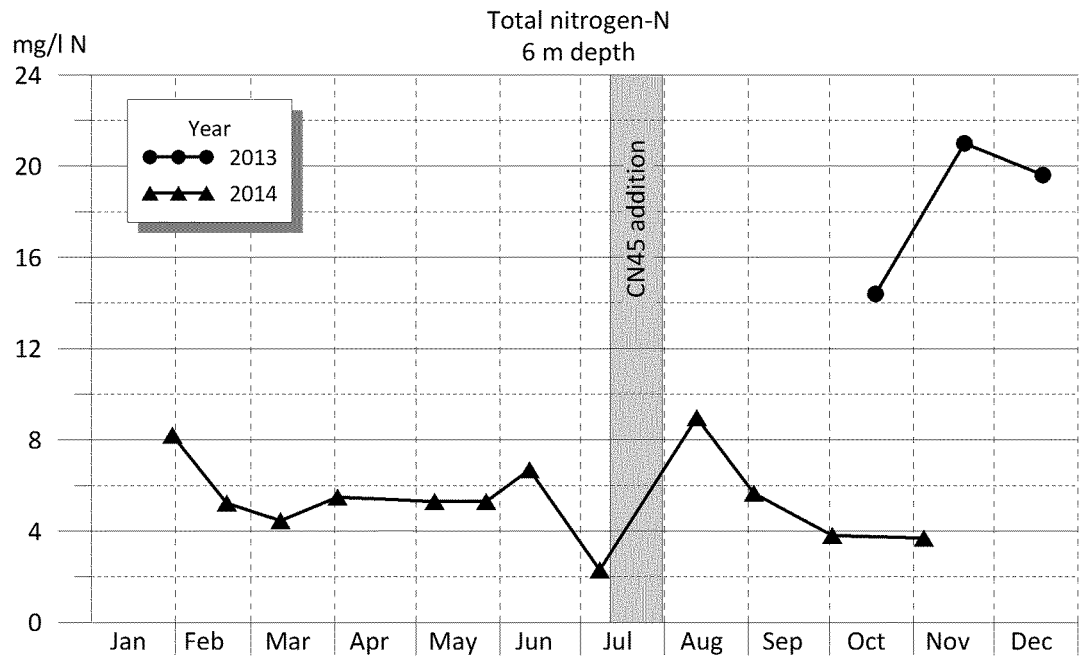
FIG. 9 shows a graph with a comparison of total nitrogen-N concentration in the years 2013 and 2014 in the measuring point 6 of Lake Schafersee as indicated in FIG. 2.
Figure 10:
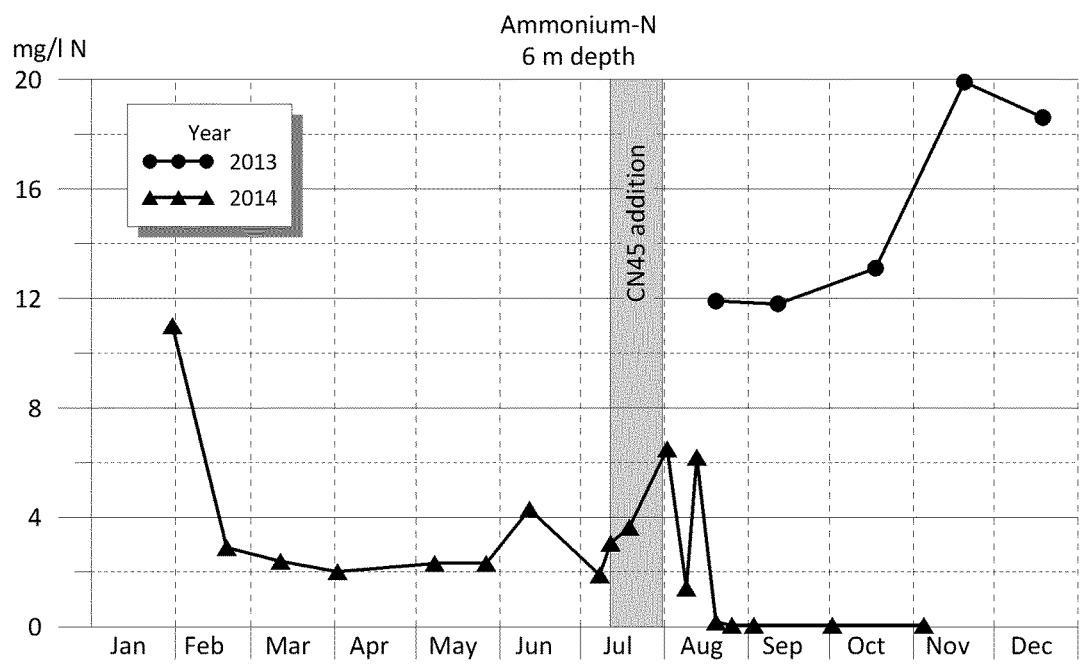
FIG. 10 shows a graph with a comparison of ammonium-N concentration in the years 2013 and 2014 in the measuring point 6 of Lake Schafersee as indicated in FIG. 2.
Figure 11:
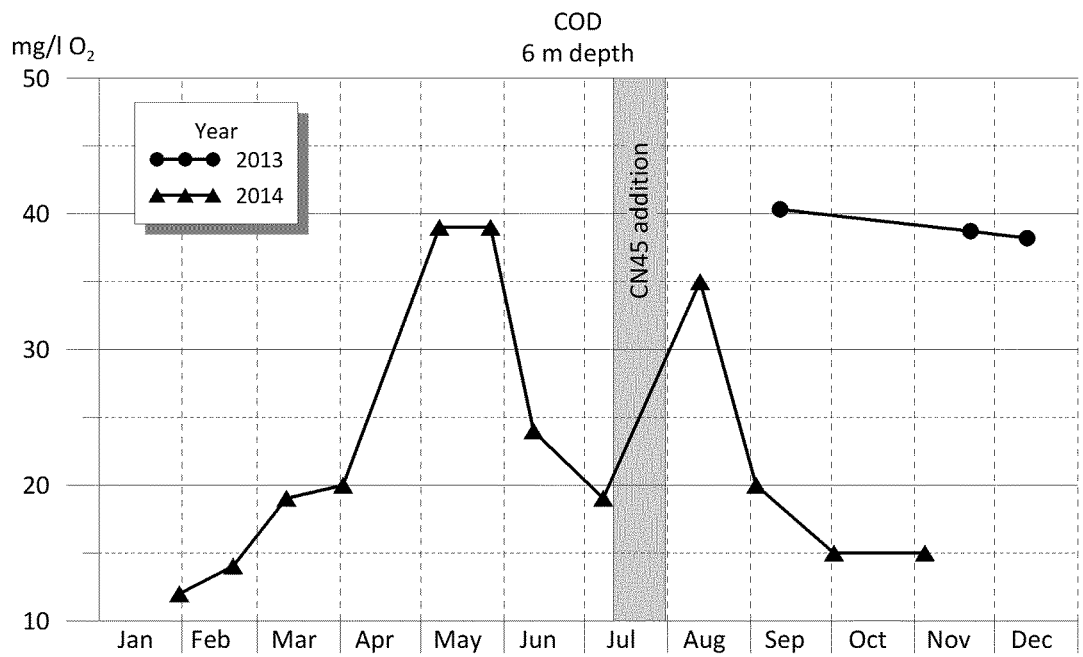
FIG. 11 shows a graph with a comparison of the Chemical Oxygen Demand (COD) in the years 2013 and 2014 in the measuring point 6 of Lake Schafersee as indicated in FIG. 2.

In the deep water of the Schafersee, in 2013, extreme high phosphorus concentrations of 1.5-2.5 mg/l (see FIG. 8) and nitrogen concentrations of 14-20 mg/l (see FIGS. 9 and 10) were determined. This can be explained by a strong redissolution of nutrients from the sediment of the lake, which was triggered by the also confirmed reducing conditions (see FIG. 5).

Figure 12:
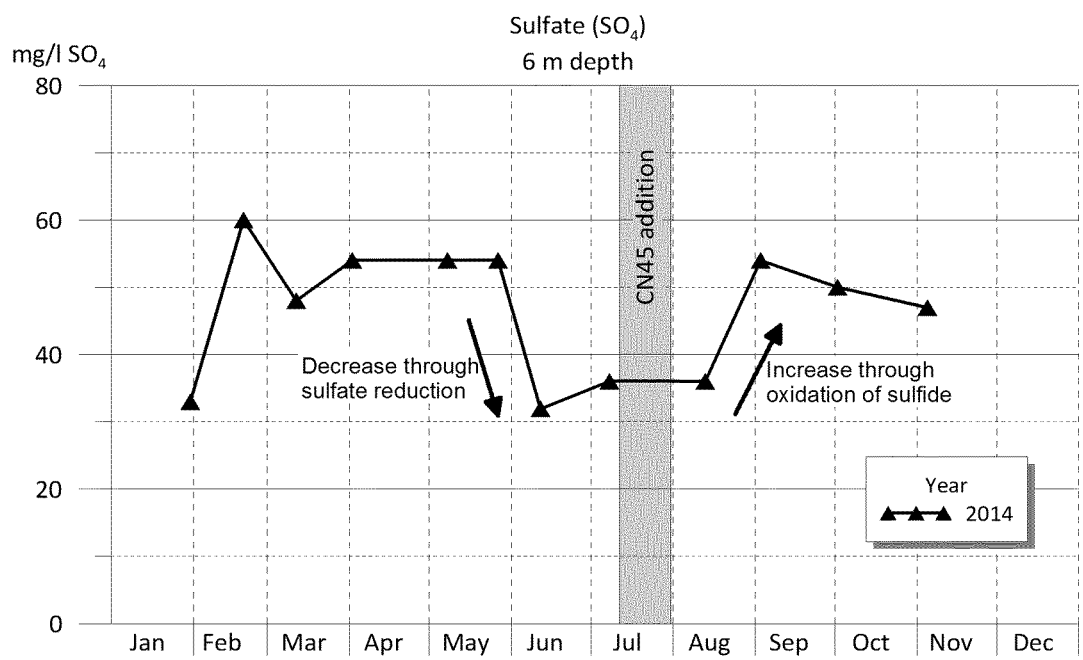
FIG. 12 shows a graph with a comparison of annual variation of the sulphate concentration in 2014 in the measuring point 6 of Lake Schafersee as indicated in FIG. 2.

The COD (Chemical Oxygen Demand) is declining because ammonium, reduced sulfur (hydrogen sulfide) and diluted or solid organic substances are oxidized. FIG. 12 shows the process of sulphur oxidization resulting in an increase of sulfate.

To investigate the spatial distribution of the addition of the calcium nitrate solution, comparative measurements were done of the probe parameters (in-situ), as well as laboratory parameters were done at a second location a little further away from the introduction point of the calcium nitrate solution, i.e. in measuring point 4 as can be seen on FIG. 2.

Figure 13:
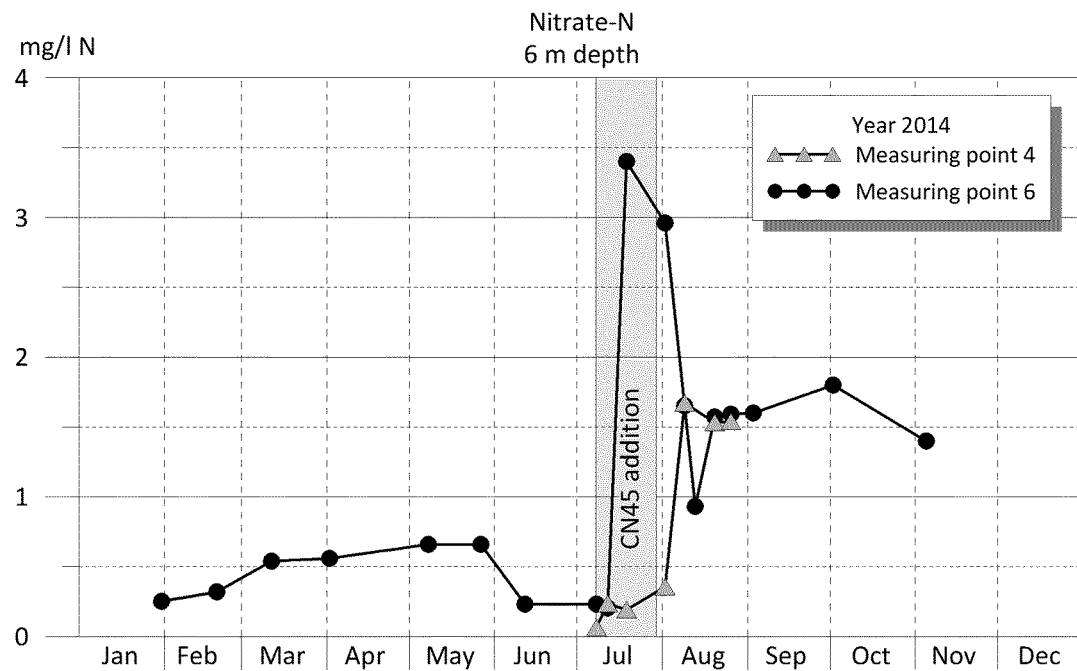
FIG. 13 shows a graph with a comparison of nitrate-N concentration at 6 meter depth in the year 2014 in the measuring points 4 and 6 of Lake Schafersee as indicated in FIG. 2.

The measurements of the total nitrate-N concentration, the ammonium-N concentration, the redox potential, the oxygen content and the total phosphorous concentration that were done at measuring point 6 as indicated in FIG. 2 have also been done at measuring point 4. As can be seen in FIG. 13, the spatial distribution of nitrate-N was detected with a time lag of about three weeks.

Figure 14:
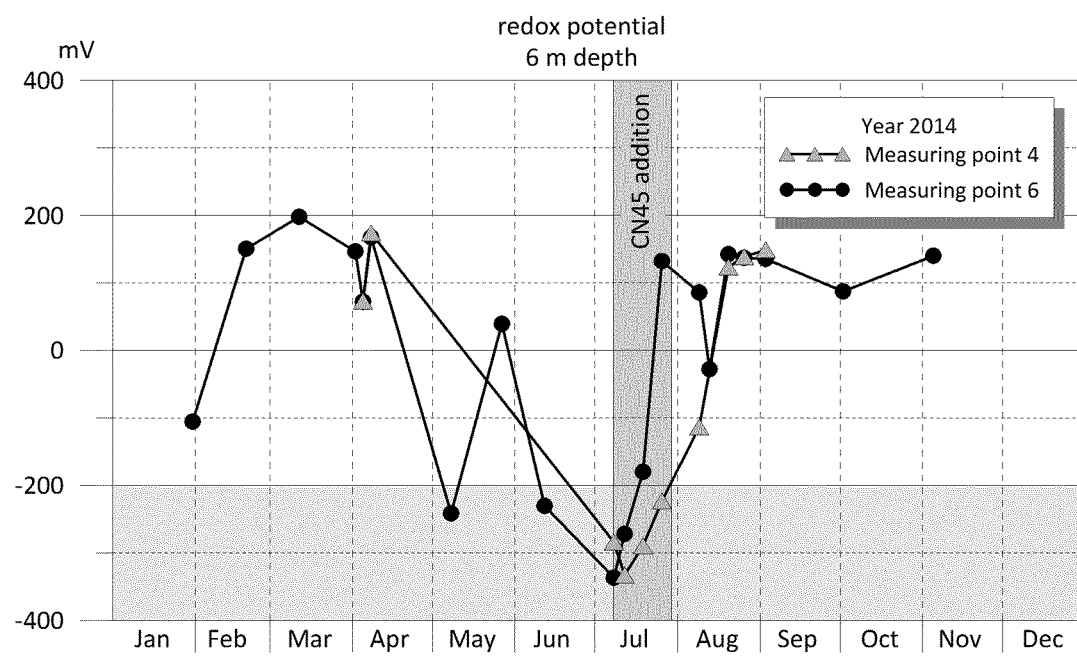
FIG. 14 shows a graph with a comparison of the redox potential at 6 meter depth in the year 2014 in the measuring points 4 and 6 of Lake Schafersee as indicated in FIG. 2.
Figure 15:
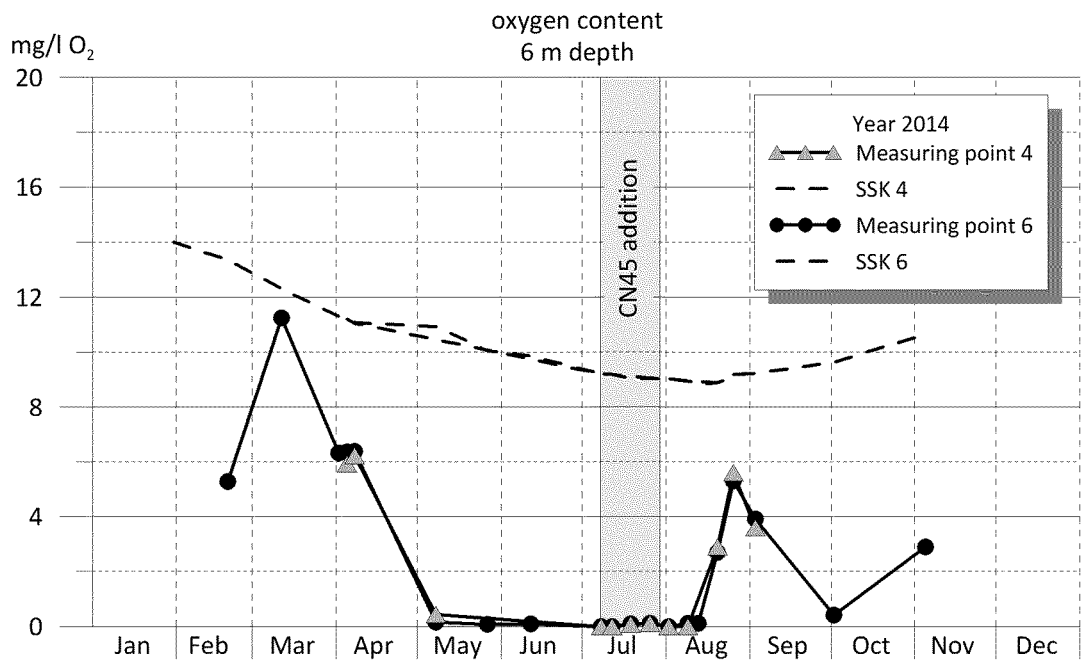
FIG. 15 shows a graph with a comparison of the oxygen content in the year 2014 in the measuring points 4 and 6 of Lake Schafersee as indicated in FIG. 2.

The same could be observed with the other parameters. As can be seen in FIG. 14, the redox potential increased in measuring point 4 towards the end of August 2014 with the same positive value of about +100 mV as in measuring point 6. As can be seen in FIG. 15, oxygen was detected in measuring point 6 as well as in measuring point 4.

Figure 16:
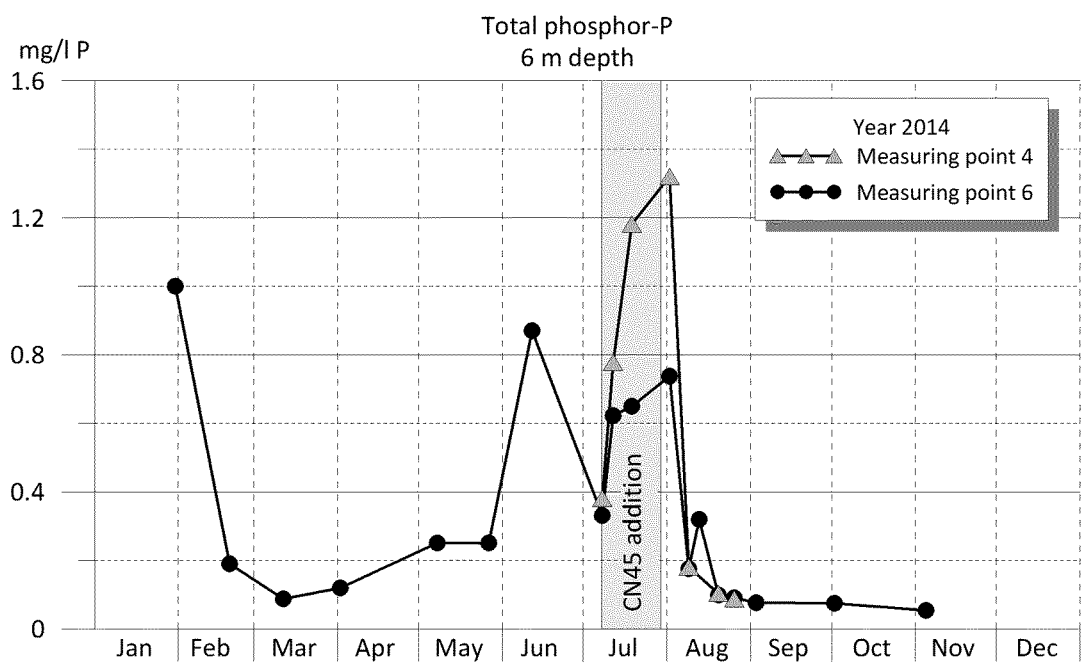
FIG. 16 shows a graph with a comparison of the phosphorous concentration in the year 2014 in the measuring points 4 and 6 of Lake Schafersee as indicated in FIG. 2.

In order to investigate the redissolution of the nutrients from the lake sediment, the total phosphorus content was also determined at measuring point 4. In accordance with the delayed distribution on total nitrate-N, also the reduction of the phosphorus was delayed. As can be seen in FIG. 16, at the beginning of the redissolution of phosphorus, concentrations of P up to 1.3 mg/l were obtained in early August 2014 in measuring point 4. However, with an increasing total nitrate-N concentration and increasing redox potential, an equally sharp decline in the phosphorus concentration to values below 0.1 mg/l was determined.

Figure 17:
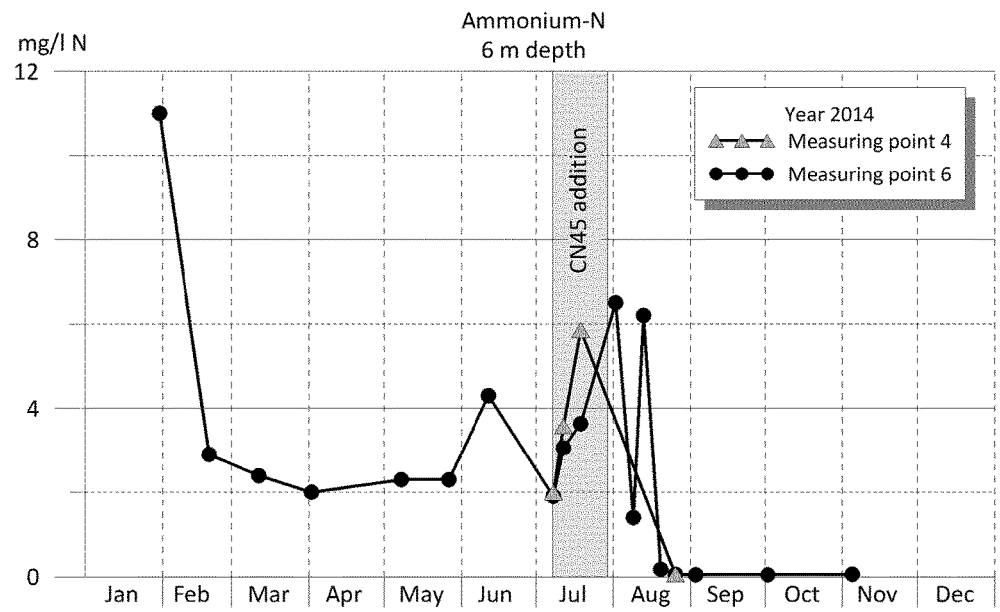
FIG. 17 shows a graph with a comparison of the ammonium N-concentration at 6 meter depth in the year 2014 in the measuring points 4 and 6 of Lake Schafersee as indicated in FIG. 2.

As can be seen in FIG. 17, similar behavior of the oxidation of ammonia could be seen. At measuring point 4 in August 2014, a concentration of ammonium-N below the detection limit of 0.05 mg/l was reached.

Example 2

This example shows a way of the calculation of the necessary CN concentrations, with a focus on the variability of the different parameters such as stock solution, first dilution etc. depending on the water flow, injection periods, etc. Depending on the sum of different parameters, there is a wide range of possible values for starting concentrations and dilutions, to obtain the final concentration in the water body, here Lake Schäfersee. Optimization and therefore measurements are necessary because in every water body, the conditions of microbiological processes are different. Also the detection of the right time for injection measurements of temperature, oxygen and redoxpotential in a depth profile are necessary. The right time for injection for stratified lakes is a stable stratification, beginning anoxia and a negative redoxpotential/anoxia for shallow lakes. Furthermore, the control of nitrate and oxygen is necessary to adjust the right dosage of nitrate when it is differing from the first calculations. The measurement of nitrite and chloride is important for the detection of fish toxicity.

The volume of the hypolimnion of Lake Schäfersee to be remedied and/or restored is about 50,000 m³. To ensure to reach a final concentration of 2 mg nitrate-N/l water N, 2000 l of CN45 (=a calcium nitrate solution with a 45 weight % of calcium nitrate), providing 220 kg nitrate-N, was applied in the initial stage of the treatment process. In that way, a medium concentration of 4.4 mg nitrate-N/l water is obtained. Taking into account a loss of half of this medium concentration by spontaneous denitrification and other microbiological processes, a final concentration of 2.2 mg nitrate-N/l water was obtained. The calcium nitrate solution was dosed into the hypolimnion by means of a pump having a flow of 50 m³/hour. The pump worked 8 hours per working day and 5 working days in a working week. A final volume of 6.000 m³ of calcium nitrate was pumped into the hypolimnion, which is nearly 12% of the total volume of the hypolimnion. In this case, the oxidized stock volume was concentrated up to 0.037 g nitrate-N per liter water.

The invention claimed is:

1. Method for remediation and/or restoration of a body of water comprising a surface water layer and an anoxic body of water lying below the surface water layer, wherein a calcium nitrate solution is added to the anoxic body of water, CHARACTERIZED IN THAT the method comprises the steps of
    mixing water having a percent of oxygen saturation between 50% and 150% with a calcium nitrate solution, resulting in a mixture, wherein the water that is mixed with the calcium nitrate solution is taken from the surface water layer, the anoxic body of water or a ground water source in the vicinity of the body of water, and is subsequently mixed with oxygen, thereby obtaining water having a percent of oxygen saturation between 50% and 150%,
    pumping the mixture into the anoxic body of water until the final concentration of nitrate-nitrogen in the anoxic body of water is between 1 to 20 mg/l, thereby remediating and/or restoring the anoxic body of water.

2. Method according to claim 1, wherein the body of water is a thermally stratified body of water and wherein the anoxic body of water lying below the surface water layer is a hypolimnion of the thermally stratified body of water.

3. Method according to claim 2, wherein the thermally stratified body of water has an epilimnion, and the water that is mixed with the calcium nitrate solution is water taken from the epilimnion.

4. Method according to claim 2, wherein the water that is mixed with the calcium nitrate solution is water taken from the hypolimnion which is subsequently mixed with oxygen, thereby obtaining the water having a percent of oxygen saturation between 50% and 150%.

5. Method according to claim 2, wherein the thermally stratified body of water has an epilimnion, and wherein the water that is mixed with the calcium nitrate solution is taken from a ground water source in the vicinity of the thermally stratified body of water and is subsequently mixed with oxygen, thereby obtaining the water having a percent of oxygen saturation between 50% and 150%.

6. Method according to claim 1, wherein the anoxic body of water lying below the surface water layer is water contained in a sludge or sediment layer at a bottom of the body of water.

7. Method according to claim 6, wherein the water that is mixed with the calcium nitrate solution is taken from the water contained in the sludge or sediment layer and which is mixed with oxygen to a percent of oxygen saturation between 50% and 150%.

8. Method according to claim 1, wherein the method further comprises the step of controlling and optimizing the amount of calcium nitrate solution that has to be added to the anoxic body of water and the time when and for how long the calcium nitrate solution has to be added to the anoxic body of water.

9. Method according to claim 1, wherein the calcium nitrate solution comprises one or more substances for enhancing precipitation of phosphorus.

10. System (1) for remediation and/or restoration of a body of water comprising a surface water layer and an anoxic body of water lying below the surface water layer, wherein the system (1) is arranged to perform a method according to claim 1, wherein the system (1) is provided with means to add a calcium nitrate solution to the anoxic body of water, CHARACTERIZED IN THAT the means to add the calcium nitrate solution to the anoxic body of water comprises a mixing device (2) arranged to mix the calcium nitrate solution with water having a percent of oxygen saturation between 50% and 150%, resulting in a mixture, wherein the system (1) comprises a first pumping means (5) for pumping the mixture into the anoxic body of water and a second pumping means (6) for pumping the water that is to be mixed with the calcium nitrate solution towards the mixing device (2), and wherein the system (1) comprises an oxygen mixing means, optionally forming part of the mixing device (2), for mixing oxygen into the water that is to be mixed with the calcium nitrate solution to obtain the water having a percent of oxygen saturation between 50% and 150%.

11. System according to claim 10, wherein the second pumping means (6) are configured for pumping water from the surface layer water, ground water out of a ground water source that is situated in the vicinity of the body of water, or water from the anoxic body of water towards the mixing device (2).

12. System according to claim 11, wherein the body of water is a thermally stratified body of water and wherein the anoxic body of water lying below the surface water layer is the hypolimnion of the thermally stratified body of water, wherein the thermally stratified body of water comprises an epilimnion, and wherein the second pumping means (6) are configured for pumping water from the epilimnion towards the mixing device (2).

13. System according to claim 11, wherein the body of water is a thermally stratified body of water and wherein the anoxic body of water lying below the surface water layer is the hypolimnion of the thermally stratified body of water, wherein the thermally stratified body of water comprises an epilimnion, and wherein the second pumping means (6) are configured for pumping up ground water that is situated in the vicinity of the body of water towards the mixing device (2), wherein the system (1) comprises oxygen mixing means for mixing oxygen into the water taken from the ground water, said oxygen mixing means forming part of the mixing device (2).

14. System according to claim 11, wherein the body of water is a thermally stratified body of water and wherein the anoxic body of water lying below the surface water layer is the hypolimnion of a thermally stratified body of water, and wherein the second pumping means (6) are configured for pumping up water from the hypolimnion towards the mixing device (2), wherein the system (1) comprises oxygen mixing means for mixing oxygen into the water taken from the hypolimnion, said oxygen mixing means forming part of the mixing device (2).

15. System according to claim 11, wherein the anoxic body of water lying below the surface water layer comprises water contained in a sludge or sediment layer at a bottom of the body of water, and wherein the second pumping (6) means are configured for pumping the water separated from the sludge or sediment layer at the bottom of the body of water towards the mixing device (2), and wherein the system (1) comprises mixing means for mixing oxygen into the water separated from the sludge or sediment layer at the bottom of the body of water, said oxygen mixing means forming part of the mixing device (2).

16. System according to claim 10, wherein the mixing device (2) forms part of an onshore station.

17. Method according to claim 1, wherein mixing water having a percent of oxygen saturation between 50% and 150% with the calcium nitrate solution results in a mixture having a nitrate-nitrogen concentration between 10 and 1000 mg/l, depending on the volume of the anoxic body of water and the water flow in the anoxic body of water.

18. Method according to claim 1, wherein the water is mixed with oxygen in the form of atmospheric air, oxygen enriched atmospheric air, or 100% pure oxygen.

19. Method according to claim 1, wherein the water that is mixed with the calcium nitrate solution is subsequently mixed with oxygen, thereby obtaining water having a percent of oxygen saturation between 95% and 105%.

20. Method according to claim 1, wherein the remedied and/or restored anoxic body of water maintains a nitrate-nitrogen concentration between 1 and 5 mg/l, a positive redox potential and an oxygen content between 2 and 5 mg/l for at least one month after termination of the application or pumping of the mixture in the anoxic body of water.

* * * * *

UNITED STATES PATENT AND TRADEMARK OFFICE
CERTIFICATE OF CORRECTION

PATENT NO.        : 11,584,668 B2
APPLICATION NO.   : 16/076014
DATED             : February 21, 2023
INVENTOR(S)       : Hartmut Wassmann and Roman Klemz It is certified that error appears in the above-identified patent and that said Letters Patent is hereby corrected as shown below:

On the Title Page

Item (73), Assignee "YARA 1NTERNATIONAL ASA" should read --YARA INTERNATIONAL ASA--.

Signed and Sealed this
Twenty-eighth Day of March, 2023

Katherine Kelly Vidal
*Director of the United States Patent and Trademark Office*